United States Patent
Levitan et al.

(10) Patent No.: US 11,802,958 B2
(45) Date of Patent: Oct. 31, 2023

(54) HYBRID MULTIPLE-INPUT MULTIPLE-OUTPUT (MIMO) RADAR SYSTEM

(71) Applicant: QUALCOMM Incorporated, San Diego, CA (US)

(72) Inventors: Evgeny Levitan, Haifa (IL); Evyatar Hemo, Kiryat Bialik (IL)

(73) Assignee: QUALCOMM Incorporated, San Diego, CA (US)

( * ) Notice: Subject to any disclaimer, the term of this patent is extended or adjusted under 35 U.S.C. 154(b) by 218 days.

(21) Appl. No.: 16/882,077

(22) Filed: May 22, 2020

(65) Prior Publication Data
US 2020/0371229 A1    Nov. 26, 2020

(30) Foreign Application Priority Data
May 23, 2019   (IL) .......................................... 266846

(51) Int. Cl.
| | | |
|---|---|---|
| *G01S 13/87* | (2006.01) | |
| *G01S 13/931* | (2020.01) | |
| *G01S 7/285* | (2006.01) | |
| *G01S 7/282* | (2006.01) | |

(52) U.S. Cl.
CPC ............ *G01S 13/931* (2013.01); *G01S 7/282* (2013.01); *G01S 7/285* (2013.01); *G01S 13/872* (2013.01)

(58) Field of Classification Search
CPC ...... G01S 13/42; G01S 13/872; G01S 13/931; G01S 7/282; G01S 7/285
See application file for complete search history.

(56) References Cited

U.S. PATENT DOCUMENTS

| | | | | |
|---|---|---|---|---|
| 1,074,928 | A  * | 10/1913 | Caven ...................... | H05B 3/00 338/159 |
| 10,634,764 | B2 * | 4/2020 | Rosenbaum ............ | G01S 7/026 |
| 10,749,258 | B1 * | 8/2020 | West .................... | H04B 7/0617 |
| 2008/0272955 | A1 * | 11/2008 | Yonak ................ | H01Q 15/0086 342/54 |

(Continued)

FOREIGN PATENT DOCUMENTS

EP             3156817 A1       4/2017

*Primary Examiner* — Timothy A Brainard
(74) *Attorney, Agent, or Firm* — Polsinelli/Qualcomm Incorporated

(57) ABSTRACT

Methods, systems, computer-readable media, and apparatuses for radar processing based on a combination of analog beamforming, digital beamforming, and virtual arrays are described. In certain embodiments, a radar receiver receives signals simultaneously transmitted, i.e., concurrently, from a radar transmitter. Each transmitted signal corresponds to the same transmit signal, but with a respective phase being applied. The radar receiver generates, based on the received signals, a virtual array response corresponding to an array of virtual antennas. The virtual array response covers a subset of directions within a field of view to be scanned. In some embodiments, the transmissions from the radar transmitter are generated using analog beamforming, and the virtual array response generated using digital beamforming. In other embodiments, the transmissions from the radar transmitter are generated using digital beamforming, and the virtual array response generated using analog beamforming.

32 Claims, 13 Drawing Sheets

(56) References Cited

U.S. PATENT DOCUMENTS

| | | | |
|---|---|---|---|
| 2011/0241928 A1* | 10/2011 | Oswald | G01S 13/87 |
| | | | 342/90 |
| 2014/0334566 A1 | 11/2014 | Kim et al. | |
| 2016/0033632 A1* | 2/2016 | Searcy | G01S 13/424 |
| | | | 342/153 |
| 2016/0157828 A1* | 6/2016 | Sumi | G01N 29/46 |
| | | | 702/189 |
| 2018/0149736 A1 | 5/2018 | Alland et al. | |
| 2019/0072657 A1* | 3/2019 | Delos | H01Q 3/2682 |
| 2019/0227157 A1* | 7/2019 | Culkin | G01S 7/292 |
| 2019/0319355 A1* | 10/2019 | Ko | H01Q 15/10 |
| 2019/0324133 A1* | 10/2019 | Hong | G01S 7/42 |
| 2019/0361114 A1* | 11/2019 | Kim | G01S 13/865 |
| 2019/0379882 A1* | 12/2019 | Lee | H04N 13/275 |
| 2020/0145078 A1* | 5/2020 | Hong | H01Q 25/002 |

* cited by examiner

HYBRID MULTIPLE-INPUT MULTIPLE-OUTPUT (MIMO) RADAR SYSTEM

CROSS-REFERENCE TO RELATED APPLICATION

This application claims priority under 35 U.S.C. § 119 to Israel Patent Application No. 266846, filed on May 23, 2019, and titled "HYBRID MULTIPLE-INPUT MULTIPLE-OUTPUT (MIMO) RADAR SYSTEM," the contents of which is hereby incorporated by reference in its entirety for all purposes.

BACKGROUND

Radar technology is used in various automotive applications and is considered one of the key technologies for future autonomous driving systems. Radar can work reliably in bad weather and lighting conditions, providing accurate measurements of target range, velocity, and angle in multi-target scenarios.

The fast development of autonomous driving technologies raises new requirements and motivates modern automotive radar systems to evolve from classical object detection sensors to ultra-high-resolution imaging devices with object recognition and classification capabilities. To keep pace with the speed of autonomous driving technology development, it may be beneficial for future radar systems to be capable of generating ultra-high-resolution images of the environment around a vehicle in substantially real time, for example, four-dimensional (4D) radar images that represent range, azimuth, elevation, and velocity of targets in the environment at a refresh rate of around thirty frames per second. Thus, improved radar systems are desired.

BRIEF SUMMARY

Aspects of the present disclosure relate to radar techniques based on a combination of analog and digital beamforming.

Certain embodiments are described that relate to radar processing based on generating receiver response corresponding to the response of a virtual array, using a combination of analog and digital beamforming techniques involving simultaneous transmission from multiple transmit antennas. With appropriate design of a transmitter and a receiver, performance requirements of automotive radar applications can be met while overcoming some of the disadvantages of a purely analog or purely digital beamforming approach. Certain embodiments described herein also offer advantages over conventional virtual array based approaches in terms of resistance to loss of coherent combining of receive signals due to Doppler shift, as well as improved beamforming gain.

In some embodiments, a radar system includes a transmitter that uses multiple transmit antennas (e.g., omnidirectional antennas) spaced apart such that the antennas are configured to transmit simultaneously toward multiple spatial locations in the environment and with a particular phase applied to the signal transmitted by each transmit antenna. The phases are applied using analog beamforming involving a specific configuration of analog phase shifters. The beamforming can generate, from the individual signals transmitted by the transmit antennas, a radar beam in a particular direction. Depending on the configuration of the phase shifters, the radar beam can be steered toward any desired direction. The radar system further includes a receiver with multiple antennas. The receiver is configured to implement digital beamforming, which involves digital phase shifting of the signals received, to select one of the transmission directions for spatial filtering and produce a virtual array response characterized by a beam pattern corresponding to an array of virtual antennas. The receiver is further configured to simultaneously generate, based on the virtual array response, information for a subset of directions within a field of view. Information for the entire field of view can be generated using at least one additional transmission involving a different phase shifter configuration.

In some embodiments, a method performed by a radar system including a radar receiver involves receiving, by the radar receiver, a first set of radar signals transmitted from a radar transmitter. Each signal in the first set of radar signals is transmitted by a separate transmit antenna, but with a particular phase applied that is specific to the separate transmit antenna. The first set of signals can be received by receive antennas in the radar receiver to generate, at the radar receiver, a composite signal representing the responses of individual receive antennas to individual signals from the first set of signals. For example, the method can further involve generating, by the radar receiver and based on the first set of radar signals, a first virtual array response corresponding to an array of virtual antennas. The first virtual array response covers a subset of directions within a field of view. The first set of radar signals can be generated using analog beamforming, and the first virtual array response generated using digital beamforming. Alternatively, the first set of radar signals can be generated using digital beamforming, and the first virtual array response generated using analog beamforming.

In some embodiments, a radar apparatus includes a transmitter and a receiver. The transmitter includes a plurality of transmit antennas and is configured to transmit a first set of radar signals, each signal in the first set of radar signals being transmitted by a separate transmit antenna and corresponding to a same transmit signal, but with a particular phase applied that is specific to the separate transmit antenna. The receiver includes a plurality of receive antennas and is configured to receive the first set of radar signals using the plurality of receive antennas. The receiver is further configured to generate a first virtual array response corresponding to an array of virtual antennas, where the first virtual array response covers a subset of directions within a field of view. The transmitter is configured to generate the first set of radar signals using analog beamforming and the receiver is configured to generate the first virtual array response using digital beamforming. Alternatively, the transmitter is configured to generate the first set of radar signals using digital beamforming and the receiver is configured to generate the first virtual array response using analog beamforming.

In some embodiments, a radar device includes one or more processors, a digital to analog converter, a splitter, one or more phase shifters, a plurality of transmit antennas, a plurality of receive antennas, and a plurality of analog to digital converters. The one or more processors are configured to generate a digital signal for transmission. The digital to analog converter is configured to convert the digital signal to an analog signal. The splitter is configured to split the analog signal into a plurality of analog signals. Each phase shifter of the one or more phase shifters is configured to rotate a phase of a respective one of the plurality of analog signals. Each antenna of the plurality of transmit antennas is configured to receive a respective one of the plurality of analog signals, and each antenna of the plurality of transmit antennas is spaced from all of the other antennas in the plurality of transmit antennas by a distance greater than two times a wavelength of any of the analog signals in the plurality of analog signals. The plurality of receive antennas are spaced from one another by one half the wavelength. Each of the analog to digital converters is configured to convert a signal received at a respective one of the plurality of receive antennas to a digital receive signal. The one or more processors are configured to receive and process the digital receive signals. As part of receiving and processing the digital receive signals, the one or more processors are configured to phase rotate the digital receive signals.

In some embodiments, one or more non-transitory computer readable media are provided. The one or more non-transitory computer readable media store instructions that, when executed by one or more processors (e.g., hardware processors of a radar system), cause the one or more processors to perform the aforementioned methods.

In some embodiments, an apparatus is provided. The apparatus includes means for performing the aforementioned methods.

BRIEF DESCRIPTION OF THE DRAWINGS

Aspects of the disclosure are illustrated by way of example. In the accompanying figures, like reference numbers indicate similar elements. Where like reference numbers are followed by a hyphen and a number, the number after the hyphen indicates a specific instance of similar elements.

DETAILED DESCRIPTION

Several illustrative embodiments will now be described with respect to the accompanying drawings, which form a part hereof. Example embodiments are described with respect to automotive radar applications. However, the embodiments described herein are also applicable to other types of radar applications, and are therefore not restricted to being used with radar systems in automobiles. While particular embodiments, in which one or more aspects of the disclosure may be implemented, are described below, other embodiments may be used and various modifications may be made without departing from the scope of the disclosure or the spirit of the appended claims.

As used herein, the terms "simultaneous" and "simultaneously" can refer to actions that are performed concurrently or together in parallel. For example, simultaneously transmitting multiple radar signals may involve concurrent transmission of signals through different transmit antennas at or around the same time. The signals need not be transmitted at the exact same moment, but from the standpoint of the operation of a radar system, the signals are effectively sent out all at once. Similarly, simultaneous data or signal processing may involve parallel processing steps such that a result of the data or signal processing is arrived at sooner than if the processing steps were performed serially, e.g., by completing one processing step before proceeding to another processing step.

Example Radar System

Figure 1:
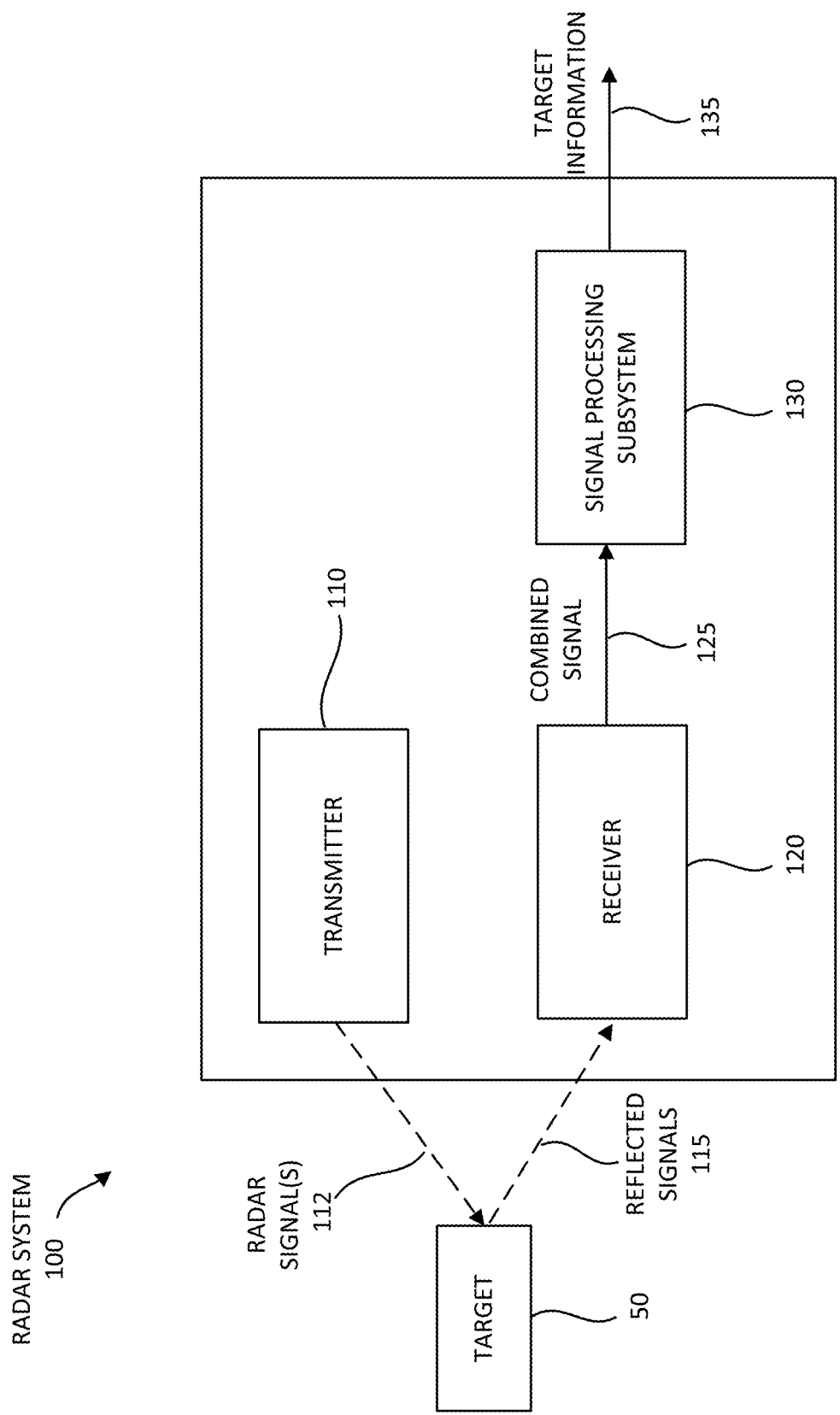
FIG. 1 illustrates an example of a radar system according to certain embodiments.

FIG. 1 is a simplified block diagram of a radar system 100 according to certain embodiments. The radar system 100 includes a transmitter 110, a receiver 120, and a signal processing subsystem 130. The radar system 100 can be configured according to certain embodiments described herein to have a coverage range of 300 meters, a field of view (FOV) of 90 degrees, and/or a large range of detectable velocities (e.g., plus or minus 50 meters per second), along with a range resolution of 0.5 meters, angular resolution of better than 1 degree, and/or Doppler resolution of 0.5 meters per second. The radar system 100 can be configured to implement one or more of the hybrid MIMO techniques described later in this disclosure. Hybrid MIMO can be applied to enhance the ability of the radar system 100 to generate ultra-high-resolution images in substantially real time while also providing the performance listed above. Certain embodiments of the radar system 100 can be configured for such high performance without requiring the use of very large antenna arrays (for example, hundreds of antenna elements). Some such embodiments may further use high bandwidth signals of approximately 1 Gigahertz, a short pulse repetition interval of approximately 20 microseconds, and/or long observation time of approximately 4 milliseconds, but other such embodiments may achieve similar performance without the use of one or more of these configurations.

Transmitter 110 includes a transmit antenna array with multiple antennas. The transmit antenna array (e.g., an array of omnidirectional or directional antenna elements) can be arranged, for example, as a linear array in which adjacent antennas are separated from each other by a fixed distance. In some embodiments, the transmit antenna array may be a multi-dimensional array (e.g., a two-dimensional grid of antennas). In addition to the transmit antenna array, the transmitter 110 can include hardware and/or software configured to generate a radar signal (e.g., a digital waveform that is converted to analog for transmission over the transmit antenna array). For example, the transmitter 110 may include signal generating components such as a pulse generator or continuous wave generator that outputs a base signal, an oscillator that generates a carrier signal, and a mixer that modulates the base signal using the carrier signal.

As discussed below, a transmitter can be configured to perform beamforming. In the context of transmitting a radar signal, beamforming is a process by which a radar beam is emitted in a desired direction, possibly multiple beams in different directions, by simultaneously transmitting multiple signals (e.g., from different transmit antennas). The multiple signals combine with each other to form the radar beam(s). The transmitted signals are typically phase offset such that they combine through constructive and/or destructive interference, thereby producing a beam in a desired direction. Accordingly, the transmitter can include a digital-to-analog converter (DAC), a separate phase shifter coupled to each transmit antenna, and a splitter configured to split a radar signal being transmitted into multiple signals, each of which is input to a corresponding phase shifter.

Receiver 120 includes a receive antenna array with multiple antennas. The antennas of the receive antenna array can be arranged in a similar manner to the antennas in the transmit antenna array. In some embodiments, the number of antennas in the receive antenna array is the same as in the transmit antenna array. However, the receive antenna array can be configured differently than the transmit antenna array, such as with a different number of antennas or a different antenna layout. Each antenna in the receive antenna array is configured to generate a respective received signal, which is analog, in response to an incident signal (e.g., one or more reflected signals 115). In addition to the receive antenna array, the receiver 120 can include hardware and/or software configured to condition or otherwise prepare the received signals for further processing (e.g., by the signal processing subsystem 130). For example, the receiver 120 may include an analog to digital converter (ADC), a mixer configured to demodulate the received signals, and/or a signal combiner configured to combine received signals (e.g., an analog combiner configured to sum the received signals together).

As discussed below, a receiver can be configured to perform beamforming. Similar to how beamforming can be used on the transmit side to emit a radar beam in a desired direction, beamforming can be applied on the receive side to make the response of a receive antenna array directional. Beamforming on the receive side can be implemented in a similar manner, by introducing phase offsets to the received signals produced by different antennas in a receive antenna array prior to combining the received signals for further processing (e.g., by the signal processing subsystem 130). Accordingly, in some embodiments, the receiver 120 may include a digital beamformer (BF) that combines and digitally phase shifts received signals after the received signals have been converted from analog to digital.

Signal processing subsystem 130 is configured to perform signal processing on the received signals and/or other signals generated by the receiver 120. For instance, as depicted in FIG. 1, the input to the signal processing subsystem 130 can include a combined signal 125. The combined signal 125 may correspond to the output of an analog combiner or a digital BF of the receiver 120. The signal processing subsystem 130 can process the combined signal 125 to determine one or more attributes of any targets 50 in the environment. For example, the radar system 100 could be deployed in a motor vehicle and a target 50 could be another vehicle, a pedestrian, or other object. Attributes that can be determined based on the processing performed by the signal processing subsystem 130 include, for example, velocity, distance/range, and direction (e.g., azimuth and/or elevation). The attributes determined by the signal processing subsystem 130 can be used in various downstream operations. For example, signal processing subsystem 130 could provide the attributes as target information 135 to a vehicle controller (e.g., an electronic control unit) configured to control one or more driving parameters (e.g., velocity, acceleration, steering, and/or braking) based on the presence of targets in the environment and the attributes of those targets, as indicated by the target information 135.

Although depicted as separate blocks, the transmitter 110, the receiver 120, and the signal processing subsystem 130 can share components. For example, in some embodiments, the radar system 100 is implemented as a radar device with one or more processors configured to perform processing associated with the transmitter 110, the receiver 120, and/or the signal processing subsystem 130.

Figure 2:
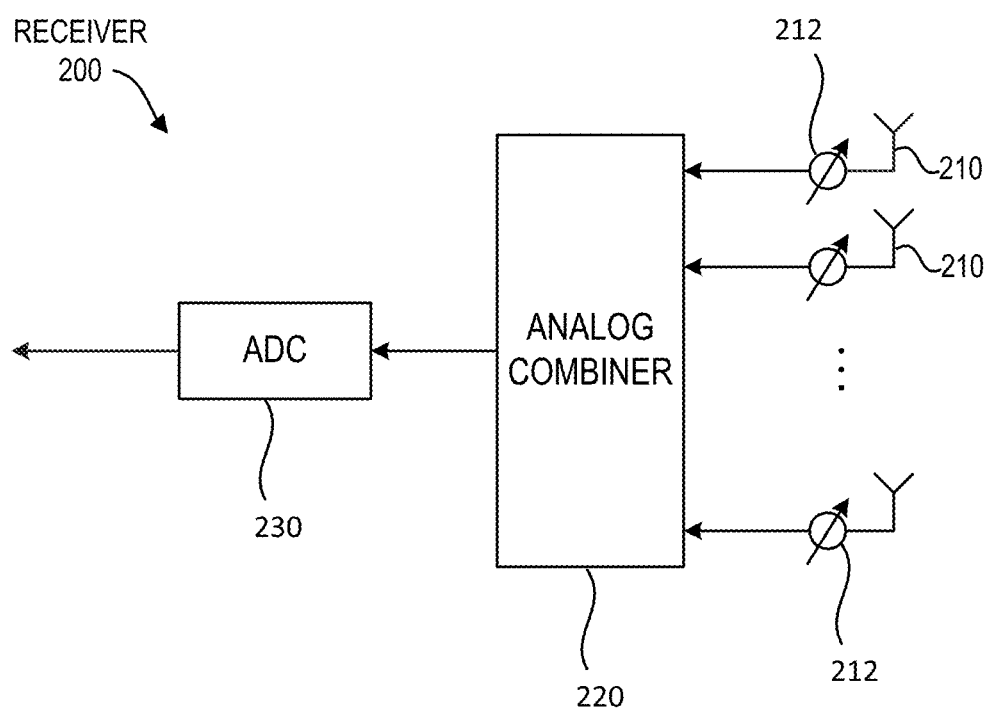
FIG. 2 illustrates an example of a receiver for an analog beamforming radar system.

Overview of Analog and Digital Beamforming Systems, Hybrid Beamforming, and MIMO Systems FIG. 2 illustrates an example of a receiver 200 for an analog beamforming radar system. The receiver 200 includes an ADC 230, an analog combiner 220, and multiple antenna elements 210. Each antenna element 210 is an antenna in a receive antenna array and is coupled to a respective phase shifter 212.

Analog phased array systems are among the simplest and most cost-effective radar architectures and generally use a single digital chain (a single ADC or DAC) together with multiple analog phase-shifters (e.g., the phase shifters 212) to electronically steer a received beam (e.g., the reflected signals 115 from FIG. 1) to different directions, for example to sequentially scan all sectors in the desired field of view.

The receiver 200 can be paired with a transmitter. The corresponding transmitter used in conjunction with the receiver 200 is not depicted in FIG. 2, but may be configured in any number of different forms. For example, the transmitter may be similarly structured, with the same number of antenna elements as the receiver 200, but with an analog splitter instead of an analog combiner, and with a DAC instead of an ADC. To generate a radar beam, each antenna of the transmitter can transmit the same signal, but phase rotated, e.g., with different phase shifts. The difference between the phases determines the direction of transmission. For example, if the phases are all equal, then maximum energy is received by a target orthogonal to the plane of the transmit antenna array because the signals sum up coherently in this direction, due to the signals from different transmit antenna elements arriving at the same time and in phase with each other. For targets in other directions, less energy is received by the target due to signals arriving at different times and out of phase with each other. Therefore, when transmitting with different phases, there are some directions where the transmitted signals are higher power due to coherent combining, and other directions with lower power due to lack of coherent combining. The direction of transmission can thus be controlled through configuring the phase shifts on the transmit side.

On the receive side, the analog signal received at each antenna 210 can undergo a phase rotation performed by the phase shifters 212, and then combined by the analog combiner 220 for input to the ADC 230. The output of the ADC 230 may then be subjected to signal processing for detection of a target and its characteristics (velocity, range, etc.). The phases of the antennas 210 on the receive side generally match the phases of their corresponding antennas on the transmit side. To scan all directions in the desired field of view, the phase configuration of all the antennas can be changed simultaneously (i.e., all together to produce a new set of phase rotations for the antennas 210 of the receiver and/or a corresponding new set of phase rotations for the antennas of the transmitter). Changing the phase configuration produces a different direction of transmission and/or reception. The phase configuration can then be changed again for the next set of simultaneous transmissions/receptions. In this manner, the field of view can be scanned sequentially by sweeping different directions in the field of view.

A main drawback of analog phased array radars is long scanning time, which makes it difficult to simultaneously meet the wide field of view, high angular resolution, and high frame rate requirements of automotive imaging radar. Another weakness of analog phased array systems is the relatively low accuracy of currently available analog phase shifters. Often, simple 4-level phase shifters that can rotate a transmit or received signal by 0, 90, 180, or 270 degrees are used. Being restricted to one of four possible phase rotations introduces a very high quantization error because it is not possible to precisely control the direction of transmission/reception. This phase quantization error is manifested in the presence of high powered sidelobes in the transmit and/or receive beam pattern, thus limiting dynamic range and reducing angular resolution capability. When looking at power of the beams formed in different directions, there should ideally be a main lobe where the power is at a peak and significantly higher than any lobes associated with other directions. If there are high powered sidelobes, this can lead to detection of false targets due to inability to discriminate between weak targets (e.g., targets that are far away) and high powered sidelobes. Increasing the number of quantization levels in the phase shifters may be beneficial, but in many implementations does not completely alleviate the problem of high powered sidelobes and may also increase hardware complexity.

Figure 3:
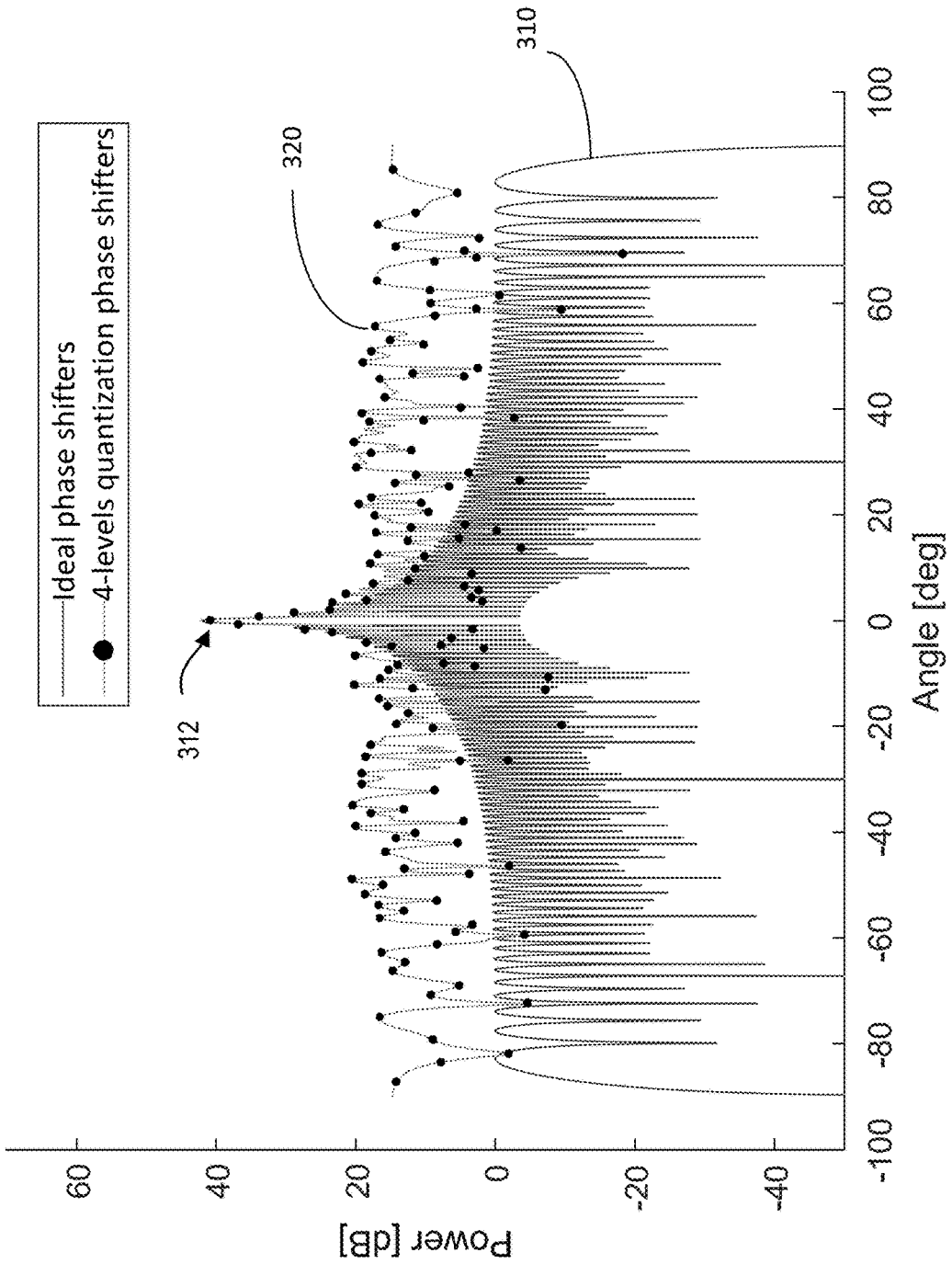
FIG. 3 shows a beneficial beam pattern for analog beamforming versus a beam pattern formed using analog phase shifters with a limited number of quantization levels.

FIG. 3 illustrates the above-described problem associated with using analog phase shifters. FIG. 3 shows an example of a beneficial analog beamforming beam pattern 310. The beam pattern 310 is a pattern that would be produced assuming the use of phase shifters that do not introduce quantization error. As shown in FIG. 3, the beam pattern 310 includes a main lobe 312 that is located at zero degrees and much higher in power (around 40 decibels) than lobes in other directions. FIG. 3 also shows an example analog beamforming beam pattern 320 resulting from using 4-level phase shifters. As shown in FIG. 3, the beam pattern 320 features a main lobe with the same power as the main lobe 312 in the beam pattern 310, but the power of the sidelobes is increased significantly in comparison to the beam pattern 310.

Figure 4:
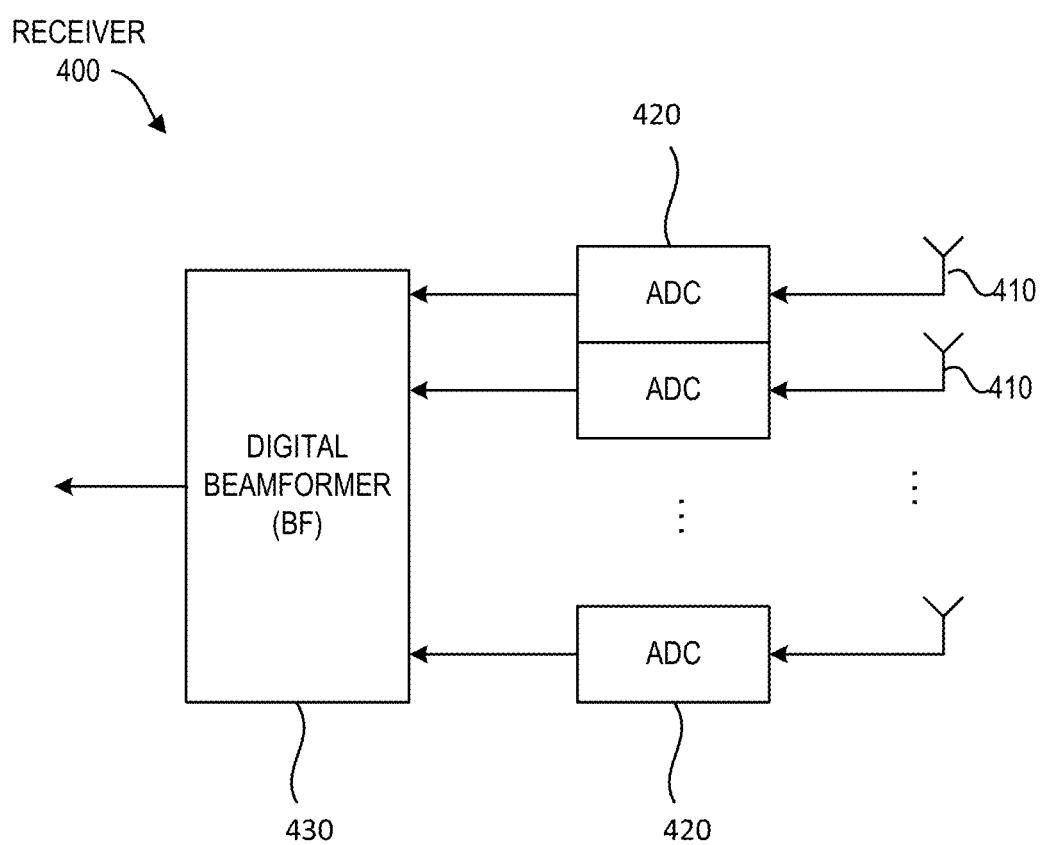
FIG. 4 illustrates an example of a receiver for a digital beamforming radar system.

FIG. 4 illustrates an example of a receiver 400 for a digital beamforming radar system. The receiver 400 includes multiple antenna elements 410. Each antenna element 410 is an antenna in a receive antenna array and is coupled to a respective ADC 420. The ADCs 420 are configured to convert the received signals into digital signals for input to a digital BF 430. As with the example in FIG. 2, on the transmit side, the transmitter paired with the receiver 400 can be structured similarly to the receiver 400. Alternatively, the transmitter could use a single omnidirectional antenna instead of a transmit antenna array having multiple antennas, or may be configured in any number of other forms. Further, as discussed above with respect to the embodiment of FIG. 1, directional antennas can be used in an antenna array (e.g., the antenna array of the receiver 400 or the antenna array of a transmitter that is paired with the receiver 400).

The digital BF 430 is configured to combine the outputs of the ADCs 420 using digital beamforming. The combining performed by the digital BF 430 is similar to the combining performed by the analog combiner 220 in FIG. 2, but may enable all directions within a field of view to be simultaneously digitally constructed with higher angular accuracy in some embodiments. Instead of analog phase shifters as in FIG. 2, the received signals from different antennas 410 are sampled via the ADCs 420 and then digitally phase shifted, by the digital BF 430. Moreover, there is no need to sweep each direction as all possible directions can be digitally calculated. Thus, the full beam pattern (for the entire field of view) can be obtained with a single transmission. Accordingly, from a performance point of view, a digital beamforming radar may provide a number of advantages over an analog beamforming radar system in some embodiments. However, a digital beamforming radar system may require a large number of ADCs, making this approach too complicated, expensive, and impractical for many automotive radar and other radar applications.

Figure 5:
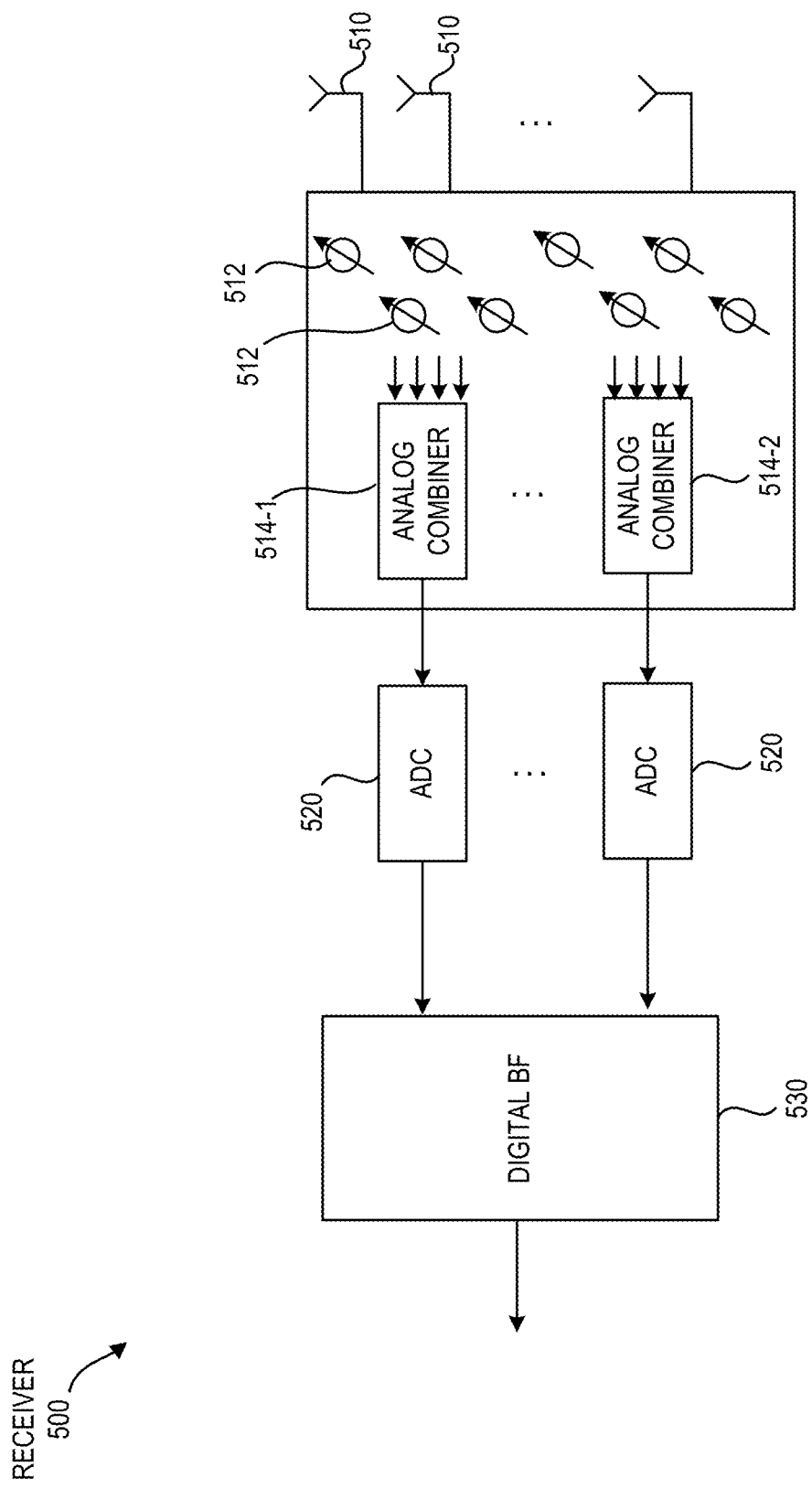
FIG. 5 illustrates an example of a receiver for a hybrid beamforming radar system.

FIG. 5 illustrates an example of a receiver 500 for a hybrid beamforming radar system. Hybrid beamforming is a beamforming technique that combines analog and digital beamforming. In a receiver implemented according to a hybrid beamforming architecture, analog beamforming is applied to a subset of receive antennas and the output of the analog beamforming is provided as an input to an ADC. For example, as shown in FIG. 5, antennas 510 are coupled to an array of phase shifters 512, with some of the phase shifters 512 being coupled to an analog combiner 514-1, and other phrase shifters 512 being coupled to an analog combiner 514-2. Each of the analog combiners 514 is analogous to the analog combiner 220 in FIG. 2, but operates on a subset of received signals instead of all the received signals generated by the receive antennas 510. As shown in FIG. 5, each analog combiner 514 can provide its output to a corresponding ADC 520, with the outputs of the ADCs 520 being supplied to a digital BF 530.

Thus, in hybrid beamforming systems the number of ADCs is generally much less than the number of antennas, with each ADC being connected to a subset of antennas via one or more phase shifters (e.g., the phase shifters 512) and digital beamforming being applied to the output of the ADCs (e.g., the ADCs 520).

Typically, when using a hybrid architecture with N number of ADCs (where N is less than the number of antenna elements in an antenna array), for each phase configuration of the analog phase shifters, N sectors can be simultaneously extracted during the digital beamforming stage, i.e., a partial field of view, but not the entire field of view. To complete a scan of the entire field of view, complementary analog scanning is usually required. The analog scanning involves multiple transmissions based on different phase shifter configurations. Thus, using a hybrid system it is possible to achieve a desired tradeoff between the number of ADCs and beam scanning time.

However, conventional hybrid beamforming architectures still suffer from the problem of high quantization error associated with using low accuracy phase shifters which, as explained above, may manifest as high energy sidelobes that reduce the angular resolution capability of the radar system. In addition, all of the architectures depicted in FIGS. 2, 3, and 5 still utilize a large number of antenna elements.

Figure 6:
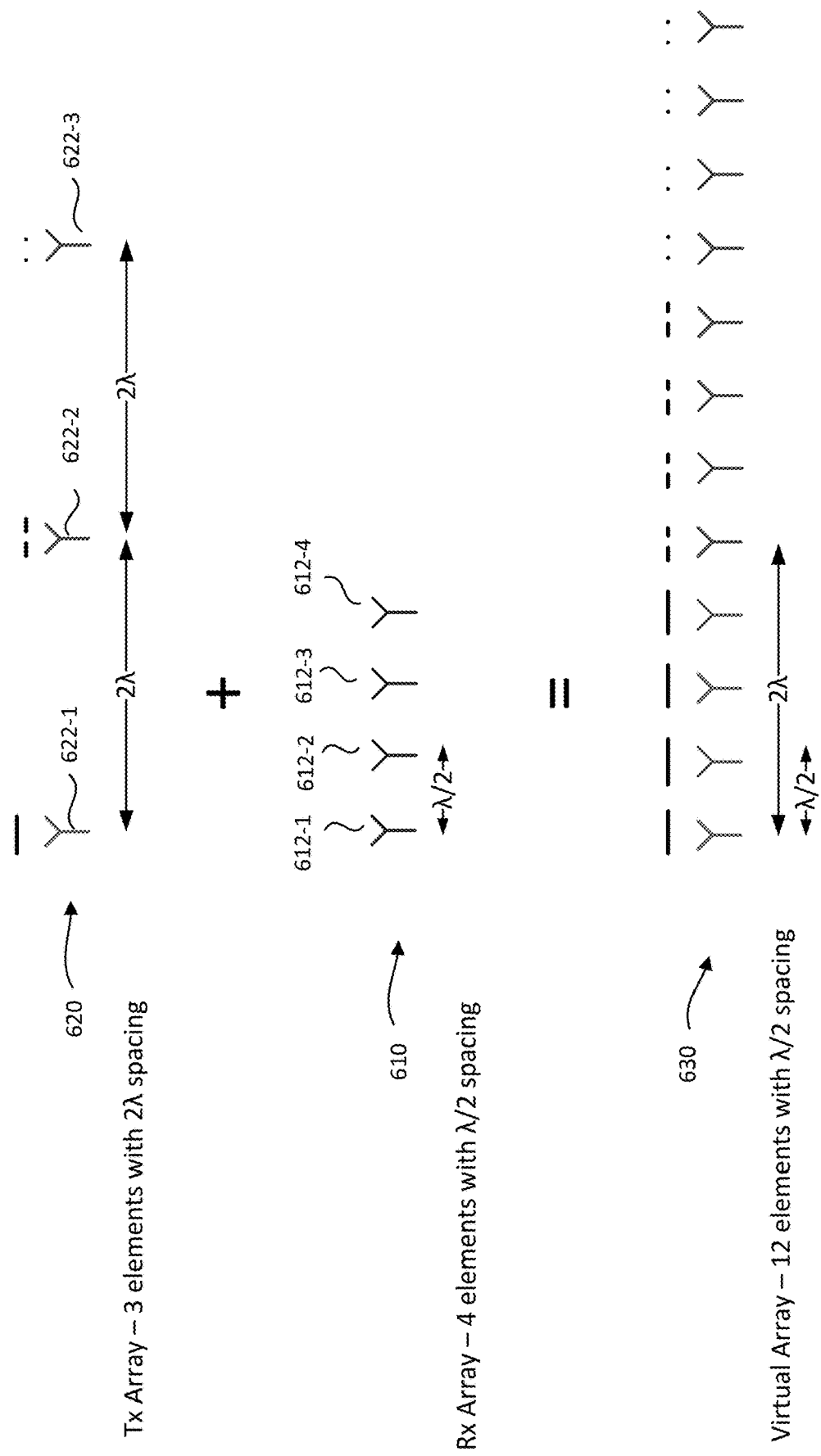
FIG. 6 illustrates a virtual array formed by a transmitter and a receiver in a MIMO radar system.

FIG. 6 is a simplified representation of a virtual array formed by a transmitter and a receiver in a MIMO radar system. Modern radar sensors use MIMO systems to reduce the total number of antennas and transmit/receive (Tx/Rx) chains without a corresponding reduction in angular resolution. The idea is to use multiple antennas on both the transmit and receive sides so that the combined Tx/Rx array response will be similar to the array response of a larger traditional phased array. This equivalent phased array is referred to as a virtual array.

As shown in FIG. 6, the location vector of antennas in a virtual array is given by the spatial convolution between location vectors of the transmit and receive antennas. In the example of FIG. 6, the receive antenna array 610 includes four receive antenna elements (physical receive antennas) 612-1 to 612-4 that are spaced relatively closely to each other, half a wavelength ($\lambda/2$) apart. On the transmit side, a transmit antenna array 620 includes three antenna elements (physical transmit antennas) 622-1 to 622-3 that are relatively widely spaced, at two wavelengths ($2\lambda$) apart. From this example, it is evident that a MIMO radar system with three transmit antennas spaced $2\lambda$ apart and four receive antennas spaced $\lambda/2$ apart is equivalent to a virtual array 630 of twelve antennas spaced $\lambda/2$ apart, thus achieving with seven physical antennas (e.g., three transmit antennas and four receive antennas) the same angular resolution as a phased array with twelve physical antennas.

Digital MIMO with Orthogonal Waveforms

Some radar sensors use all-digital MIMO radar systems with multiple high-speed ADCs and DACs. These MIMO systems simultaneously transmit mutually orthogonal signals from multiple transmit antennas and simultaneously receive the signals at all receive antennas. The transmitted signals are different from each other (e.g., with different frequencies, as opposed to transmitting the same signal with different phases). The receiver can distinguish between the transmitted signals based on their orthogonality and can digitally generate multiple beams in the entire field of view (e.g., beams for all 12 antennas of the virtual array 630 in FIG. 6).

Digital MIMO systems are quite complicated since they depend on using multiple DACs, simultaneous transmission of orthogonal waveforms, and then parallel processing of these waveforms on the receive side. For example, to implement such a MIMO system with the antenna arrangement shown in FIG. 6, there would be three DACs for the three transmit antennas 622 and four ADCs for parallel processing of the signals from the four receive antennas 612. However, FIG. 6 is a simplified example for illustration purposes (e.g., the number of transmit and/or receive antennas could be much greater in practice). Therefore, in practice, the hardware requirements for digital MIMO can make a digital MIMO system expensive to implement.

Additionally, each transmit antenna in such a digital MIMO system radiates independently. Therefore, there is no transmit beamforming gain because transmitting different signals from different antennas will not lead to coherent summing of signals. Beamforming gain is a desirable feature for achieving long range detection. In automotive applications, long range detection is important because objects can be located far from a subject vehicle (the vehicle equipped with the radar system) in terms of distance, but could be close to the subject vehicle in terms of time (e.g., another vehicle approaching the subject vehicle at high speed).

Time-Division Multiplexing (TDM) MIMO

Another way to achieve orthogonality among transmit signals is to use time division multiplexing. TDM MIMO systems can be configured to use a single DAC and successively transmit from different transmit antennas. This single DAC is switchably connected to each transmit antenna, one transmit antenna at a time. Thus, there is no simultaneous transmission in TDM MIMO systems.

This simplicity comes at the expense of longer scanning time and coherency loss of digital beamforming on the receive side, which result from the time separation between transmissions from different transmit antennas introducing phase differences between signals reflected from fast moving targets. This phase shift between two transmissions is unknown and depends on the velocity of the target. It may reduce the beamforming gain or require some complicated processing to compensate for the phase shift, or it can destroy the receive beamforming entirely or introduce ambiguity if the scanning is too slow—leading, for example, to false detection.

Also, since only a single transmit antenna is active during any given transmission, a radar system implementing TDM MIMO has no transmit beamforming gain which, as discussed above, is also a problem shared by radar systems that implement digital MIMO with orthogonal waveforms.

Example Hybrid MIMO Techniques

Techniques are described herein for a hybrid MIMO approach in which a virtual array is utilized with hybrid beamforming. The hybrid MIMO techniques described herein can be used to construct an efficient radar architecture, e.g., a radar system where the transmitter has as little as a single DAC and performs analog beamforming, and where the receiver has multiple ADCs and performs digital beamforming.

In contrast to MIMO with orthogonal signaling or TDM MIMO, a hybrid MIMO radar system implemented according to embodiments described herein can be configured to achieve transmit beamforming gain. Additionally, the hybrid MIMO techniques described herein can be implemented using low accuracy phase shifters (e.g., 4-level phase shifters), but without incurring undesirable phase quantization effects on the sidelobes of the resulting beam pattern. Thus, the hybrid MIMO techniques described herein can provide significant improvements in terms of performance, ease of implementation, and/or cost of construction.

Figure 7:
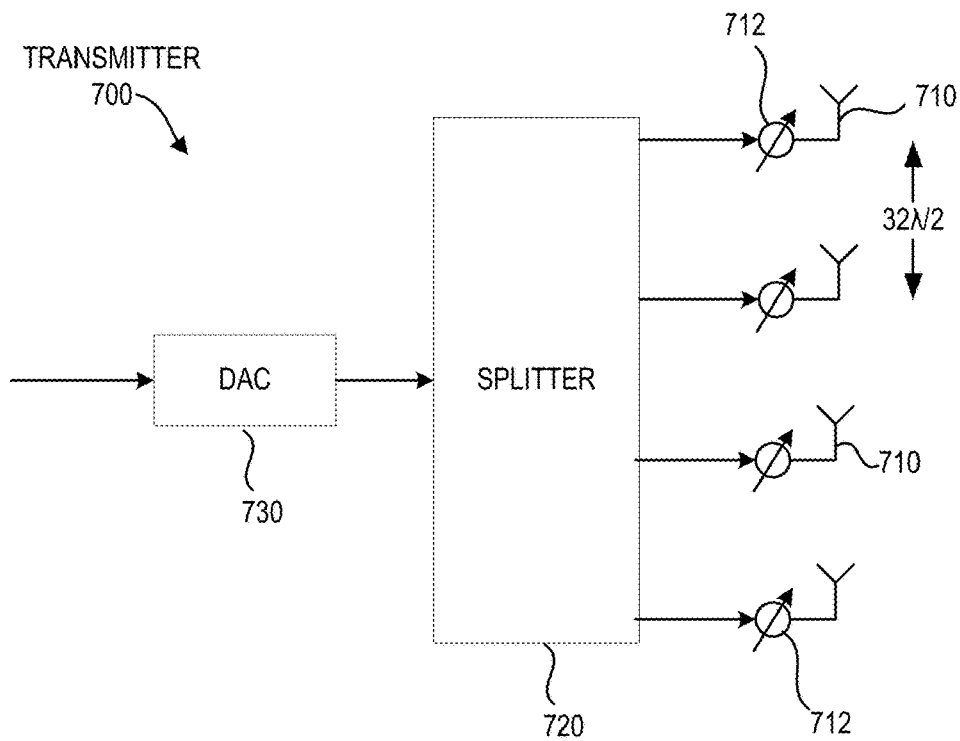
FIG. 7 illustrates an example of a transmitter according to certain embodiments.

FIG. 7 shows an example transmitter 700 for a hybrid MIMO system according to certain embodiments. For example, the transmitter 700 can be used to implement the transmitter 110 in FIG. 1. The transmitter 700 includes a transmit antenna array with multiple transmit antennas 710. Each of the transmit antennas 710 is coupled to a corresponding phase shifter 712. The input to the transmit antenna array is supplied by a splitter 720, which receives a radar signal for transmission from a DAC 730.

The splitter 720 is configured to split the radar signal received from the DAC 730 into separate signals for phase shifting by the phase shifters 712. The signals generated by the splitter 720 can be copies of the radar signal received from the DAC 730 so that each antenna 710 receives the same radar signal, but with a phase shift specific to the antenna 710. The DAC 730 is configured to feed four analog chains with one phase shifter 712 connected to each transmit antenna 710 in the illustrated embodiment.

In this example, there are four transmit antennas 710 spaced $32\lambda/2$ (e.g., $16\lambda$) apart. However, the number of transmit antennas 710 and the spacing of the transmit antennas 710 can be different in other embodiments. For example, in another embodiment, the spacing between transmit antennas 710 could be $16\lambda/2$ (e.g., $8\lambda$). As with traditional MIMO, the spacing of the transmit antennas 710 is generally more sparse compared to transmit antennas in a traditional analog beamforming system. In some embodiments, the spacing of the transmit antennas 710 can be greater than two times the wavelength of any of the signals transmitted by the transmit antennas 710.

As discussed above, the transmit antennas 710 can be configured to transmit the same signal simultaneously and with a particular phase applied to each transmitted signal. The number of levels of the phase shifters 712 required to achieve a certain level of performance may be lower compared to analog beamforming due to the relatively sparse spacing. When the number of levels is reduced, the difference between each level is greater, which may result in a reduced likelihood of a phase quantization effect that would lead to high energy sidelobes.

Figure 8:
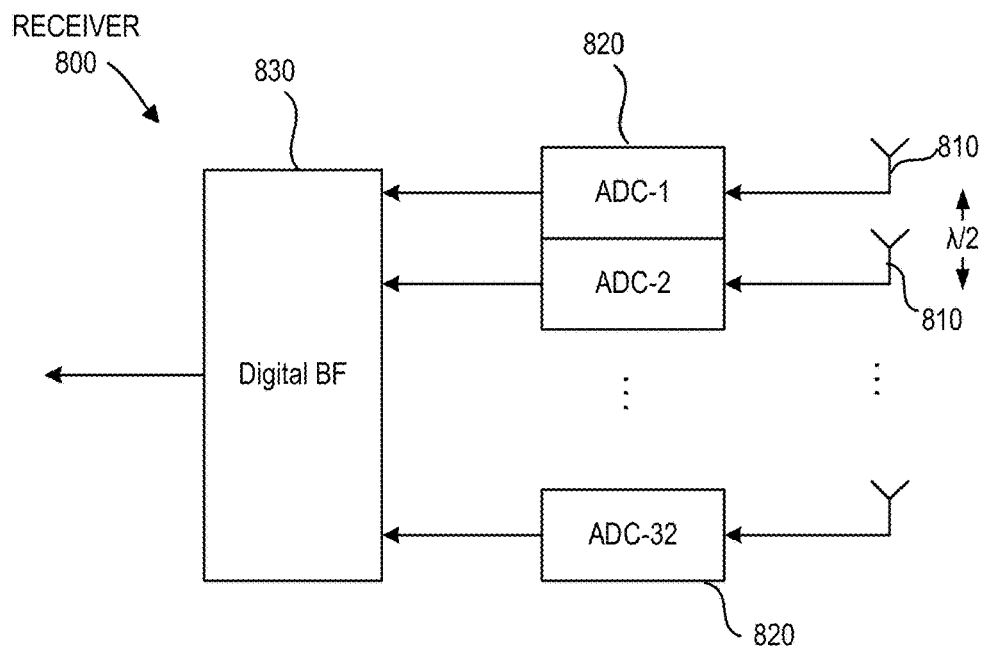
FIG. 8 illustrates an example of a receiver according to certain embodiments.

FIG. 8 shows an example receiver 800 that can be used in combination with the transmitter 700 in FIG. 7, according to certain embodiments. For example, the receiver 800 can be used to implement the receiver 120 in FIG. 1. The receiver 800 includes a receive antenna array with multiple receive antennas 810. Each receive antenna 810 is coupled to a digital BF 830 via a respective ADC 820. In this example, there are 32 receive antennas 810 spaced λ/2 apart. However, the number of receive antennas 810 and the spacing of the receive antennas 810 can be different in other embodiments. For example, in some embodiments, the number of receive antennas 810 is equal to at least the number of transmit antennas (e.g., at least 4 receive antennas 810 when using the receiver 800 in combination with the transmitter 700).

If the transmitter 700 of FIG. 7 and the receiver 800 of FIG. 8 are used together to implement a virtual array, there are 4 transmit antennas spaced 32λ/2 apart and 32 receive antennas spaced λ/2 apart. From the example discussed above with respect to FIG. 6, it will be apparent that this corresponds to a virtual array of 128 antennas spaced λ/2 apart.

Figure 9:
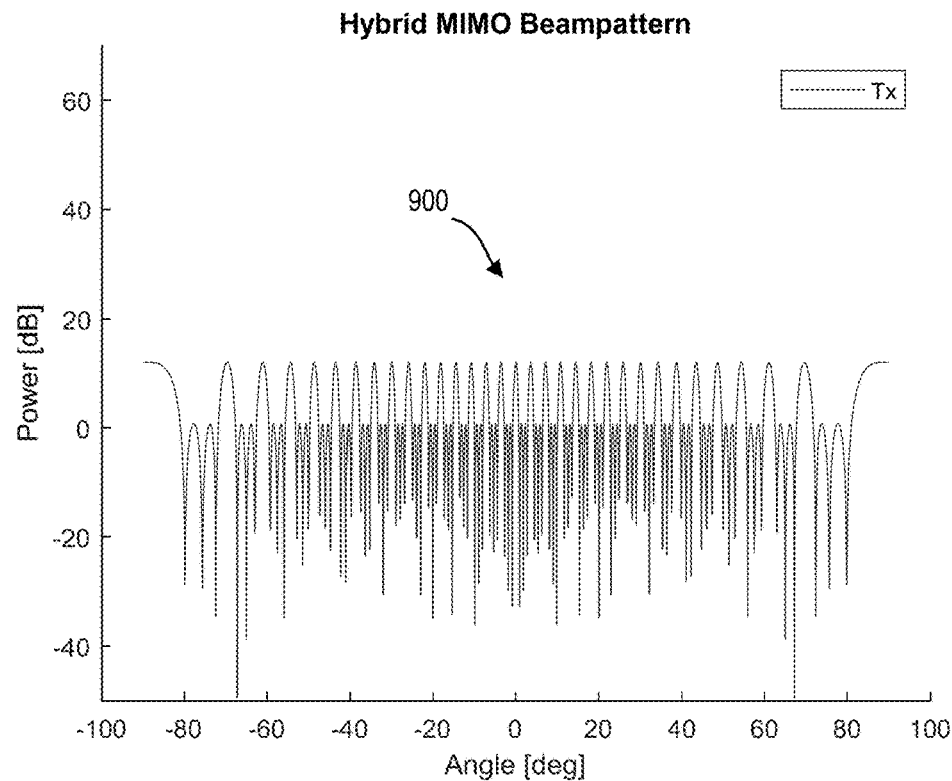
FIG. 9 illustrates an example of a transmit beam pattern that can be generated using the transmitter of FIG. 7.

For the sake of illustration, assume that all the phase shifters 712 of the transmitter 700 are configured to phase=0 and all four antennas 710 transmit simultaneously. In the corresponding transmit beam pattern (an example of which is shown in FIG. 9), it could be seen that in addition to a main lobe toward the boresight of the antenna array, there would be many grating lobes in other directions because of the large distance between the transmit antennas 710. Note, however, that the beam width is very narrow corresponding to the large aperture of the transmit antenna array.

FIG. 9 illustrates a transmit beam pattern 900 that can be generated when the transmitter 700 of FIG. 7 is configured with phase=0 and all four antennas 710 transmit simultaneously. The y-axis is power in decibels. The x-axis is angle of transmission. As shown in FIG. 9, the energies of the main lobe (located, for example, at zero degrees) and the grating lobes are similar. If the main lobe corresponds to the peak at zero degrees, there are many similarly high peaks corresponding to grating lobes in other directions (e.g., 32 directions in total, equal to a quarter of all directions in the field of view). This is a result of transmitting simultaneously using antennas that are not closely spaced. Thus, there is simultaneous transmission at different angles, albeit not the full range of angles that make up the field of view.

At the receiver (e.g., the receiver 800), digital beamforming can be used to spatially filter one of the grating lobes generated by the transmitter 700 (e.g., one of the grating lobes in FIG. 9). As discussed above in connection with forming a virtual array, a transmit beam pattern can be spatially convolved with a receive beam pattern. Thus, the receive beam pattern acts as a filter for the transmit beam pattern, and this filter can be applied to one or more grating lobes (e.g., the entire set of grating lobes or possibly a subset of grating lobes). In this way, the receiver can simultaneously construct a subset of directions, though limited to a grid of grating lobes. This is in contrast to pure digital beamforming where, as discussed earlier, it is possible to construct, from a single transmission, a beam pattern for all directions in the field of view.

Figure 10:
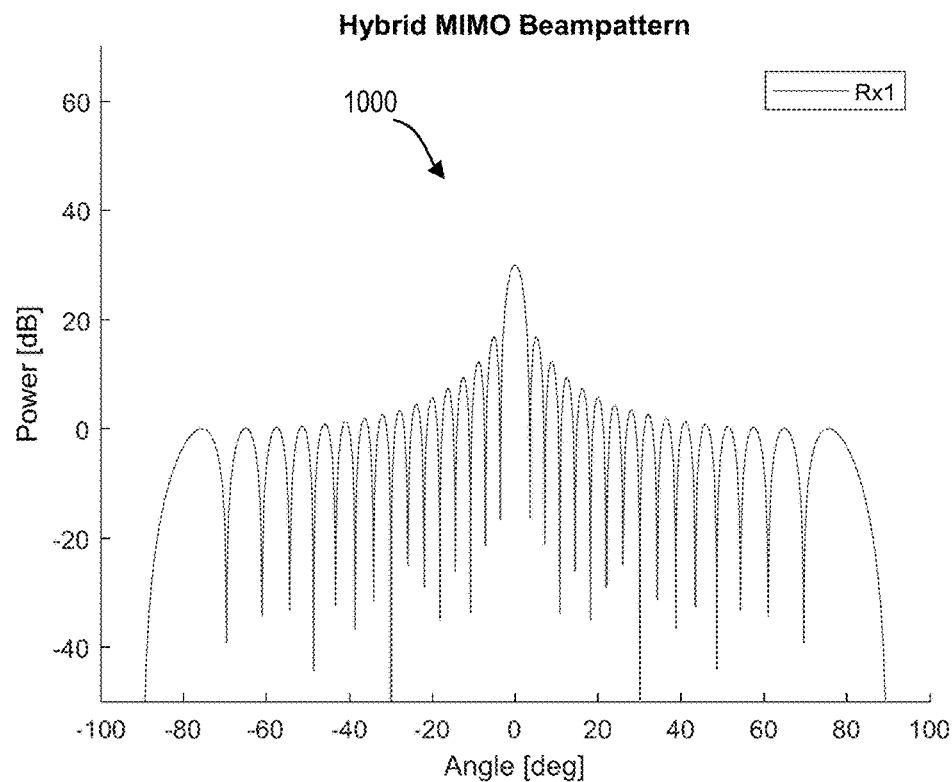
FIG. 10 illustrates an example of a receive beam pattern that can be generated using the receiver of FIG. 8 and based on the transmit beam pattern in FIG. 9.

The digital beamforming performed by the receiver can be configured to produce a receive beam pattern such as that shown in FIG. 10, which illustrates a receive beam pattern 1000 based on the example transmit beam pattern 900 in FIG. 9. It can be seen from the receive beam pattern 1000 that the receiver is able to build a beam pattern for 32 directions. The receive beam pattern 1000 is aligned to a selected lobe of the transmit beam pattern 900.

Figure 11:
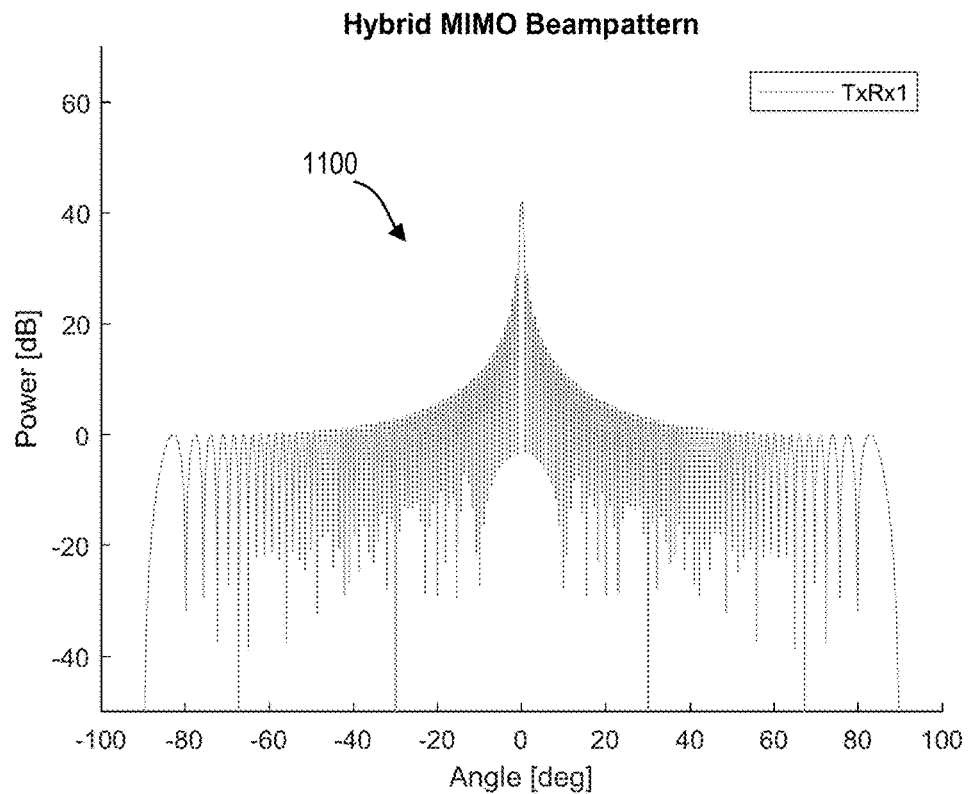
FIG. 11 illustrates an example of a beam pattern formed based on combining the beam patterns in FIGS. 9 and 10.

FIG. 11 shows a combined beam pattern 1100 resulting from filtering all of the grating lobes in the transmit beam pattern 900. As shown in FIG. 11, the combined beam pattern 1100 is a product (multiplication) of the transmit beam pattern 900 and the receive beam pattern 1000. Note that the product of the transmit beam pattern 900 and the receive beam pattern 1000 is equivalent to the beam pattern of a virtual array of 128 antenna elements. Thus, for a given transmission, 128 different directions within a field of view can be scanned in the embodiment of FIG. 11. These 128 directions can be considered as forming a single sector within the field of view.

To scan additional sectors (e.g., another 128 directions), the configuration of phase shifters in the transmitter (e.g., the phase shifters 712) can be changed to steer the transmit beam pattern (e.g., the transmit beam pattern 900), and thus the grating lobes, to another direction, for example, by one degree left or right. This allows the receiver to digitally construct another subset of sectors. A detailed discussion on how many sectors can be scanned (and therefore the total number of transmissions) to cover the entire field of view is presented in the next section below and in connection with an example radar system configuration.

Figure 12:
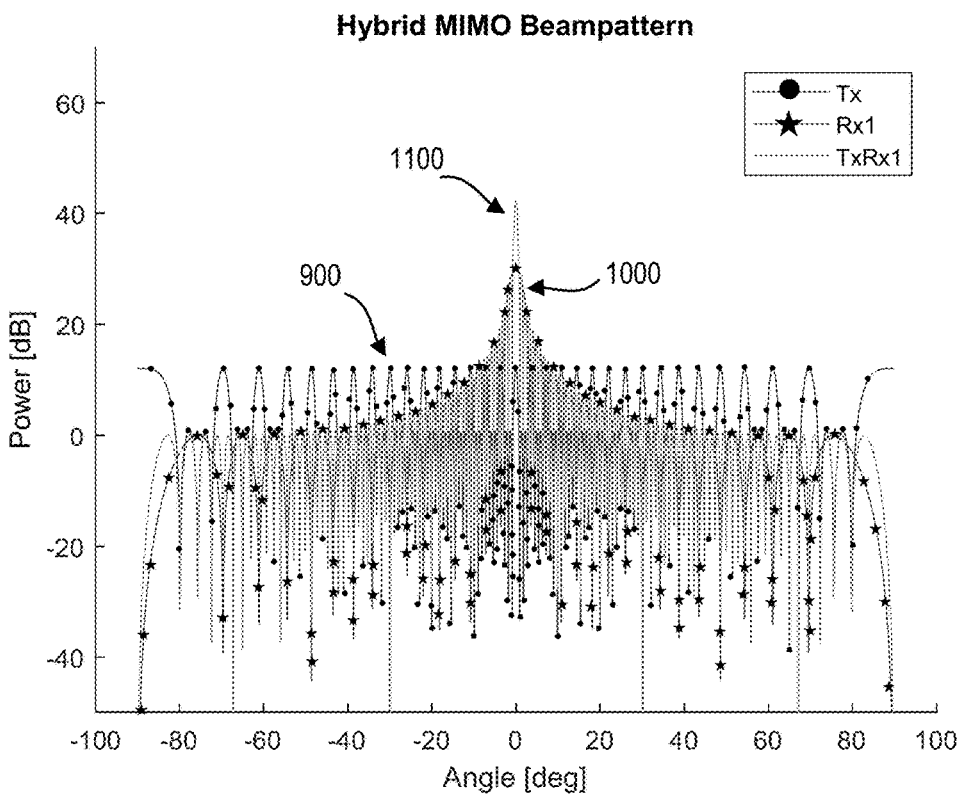
FIG. 12 shows the beam patterns of FIGS. 9 to 11 superimposed.

FIG. 12 shows the beam patterns of FIGS. 9 to 11 superimposed for comparison purposes.

Hybrid MIMO is similar in some respects to TDM MIMO, but there are important differences. Both hybrid MIMO and TDM MIMO feature a form of time-multiplexing. In TDM MIMO, different transmit antennas are used in each transmission, thus introducing coherency loss to the digital beamformer that digitally combines the signals that have been transmitted at different times. In one implementation of hybrid MIMO, a different analog transmit beamformer configuration can be used in each transmission and a subset of beams digitally generated at the receiver from a single transmission without any coherency loss caused by the Doppler effect, e.g., from a fast moving target.

Hybrid MIMO—Example Performance Analysis

Having provided an overview of hybrid MIMO techniques according to certain embodiments, the discussion now turns to the questions of: a) how many analog sectors (multi-beam sectors) should be scanned to cover the entire field of view with enough resolution; and b) what are the required quantization levels of the phase shifters in this case.

It can be shown (see mathematical derivation below) that in the following example a total of four multi-beam sectors can be scanned to cover the entire field of view with the resolution being equal to the beam width. Moreover, only 4-level phase shifters would be needed to generate all these sectors. This example is based on the transmitter and receiver configurations shown in FIGS. 7 and 8, and is intended to demonstrate the feasibility and advantages of hybrid MIMO, but is not intended to be limiting with respect to the configurations of the transmitter and receiver in a radar system implementing hybrid MIMO. For example, phase shifters with fewer or more than four levels can be used, the number of transmit and/or receive antenna elements (and thus the size of the resulting virtual array) can be different, or the spacing of antenna elements can be different.

Assuming a uniform linear array, targets located far-field, and narrow bandwidth radar signals, the phase delays of the steering vector for the incoming planar wave from direction θ are given by:

$$\frac{d \sin \theta}{\lambda} 2\pi k$$

where d is the antenna element spacing, λ is wavelength and k is antenna index.

Defining angular resolution (or beam width) of an antenna array with N elements as the bin width of the beamforming Fast Fourier Transform (FFT) yields:

$$\frac{d \sin \theta}{\lambda} 2\pi = \frac{2\pi}{N}$$

Assuming half wavelength spacing d=λ/2, the angular resolution of the antenna array is given by the following equation:

$$\sin \theta = \frac{2}{N}$$

In the example of N=128 antenna elements in the virtual array, angular resolution is equal to:

$$\sin^{-1} 2/128 = 0.895 \text{ deg}$$

Thus, the angular resolution in this example is better than 1 degree, which is more than sufficient for many automotive applications.

To compute the distance between grating lobes when the transmit phase array is steered to the boresight, find all directions θ so that the steering vector phases of all four transmit antenna elements (e.g., the transmit antennas 710 in FIG. 7) is equal to 0:

$$\frac{d \sin \theta}{\lambda} 2\pi k = 0 + 2\pi n, \text{ for } k = 0, 1, 2, 3$$

Based on the example transmit antenna array with spacing $$d = \frac{32\lambda}{2}:$$

$$\sin \theta = 2/32 n$$

Thus, the spacing between grating lobes is equal to four times the beam width of the 128-element virtual array. This means that scanning four multi-beam sectors (i.e., four different directions) would be sufficient to cover the entire field of view with the resolution being equal to the beam width.

The phases of the transmit antenna elements, spaced apart by 32λ/2, that are required to steer the transmitter beams to all four directions can be computed as follows:

$$\frac{d \sin \theta}{\lambda} 2\pi k = \frac{32 \sin \theta}{2} 2\pi k = 32\pi k \sin \theta, \text{ for } k = 0, 1, 2, 3$$

The following table summarizes the phase configurations for all four directions (i.e., the directions in which the signals emitted by the transmit antenna elements are steered for a given transmission) and for each one of the four transmit antenna elements:

| | Direction | | | |
|---|---|---|---|---|
| Element | $\sin \theta = 0$ | $\sin\theta = \frac{2}{128}$ | $\sin\theta = \frac{2*2}{128}$ | $\sin\theta = \frac{2*3}{128}$ |
| k = 0 | 0 | 0 | 0 | 0 |
| k = 1 | 0 | π/2 | π | 3π/2 |
| k = 2 | 0 | π | 0 | π |
| k = 3 | 0 | 3π/2 | π | π/2 |

Each column represents a separate transmission using a particular phase configuration of four phase shifters (e.g., the phase shifters 712 in FIG. 7). θ is the direction of the main lobe. Thus, in this example, 4-level phase shifters are sufficient to generate precise sectors in the entire field of view since the phase configurations can be achieved using phase values of 0, π, π/2, and 3π/2.

The hybrid MIMO concept can be scaled to more transmit antenna elements if high accuracy phase shifters are available. For example, if 8-level phase shifters are available, then the transmitter can be configured with 8 transmit antennas, spaced apart by ⅛th of the virtual array size, and the receiver can be configured with N/8 receive antennas spaced apart by λ/2. In this case, the distance between grating lobes in the transmit beam pattern would be eight times the beam width and eight analog multi-beam sectors could be used to cover the entire field of view.

Additionally, the type of beamforming performed by the transmitter and receiver can be interchanged such that the transmitter would, for example, have closely spaced (e.g., λ/2) antenna elements and a digital beamformer, and the receiver would have sparsely spaced (e.g., 32λ/2) antenna elements and analog phase shifters.

Hybrid MIMO for Azimuth and Elevation

The example hybrid MIMO embodiments described above can be used to compute either the azimuth direction or the elevation direction of targets. To compute both azimuth and elevation, a two-dimensional antenna array can be used instead of a one-dimensional antenna array. An example of a hybrid MIMO architecture for both azimuth and elevation scanning is shown in FIGS. 13 and 14.

Figure 13:
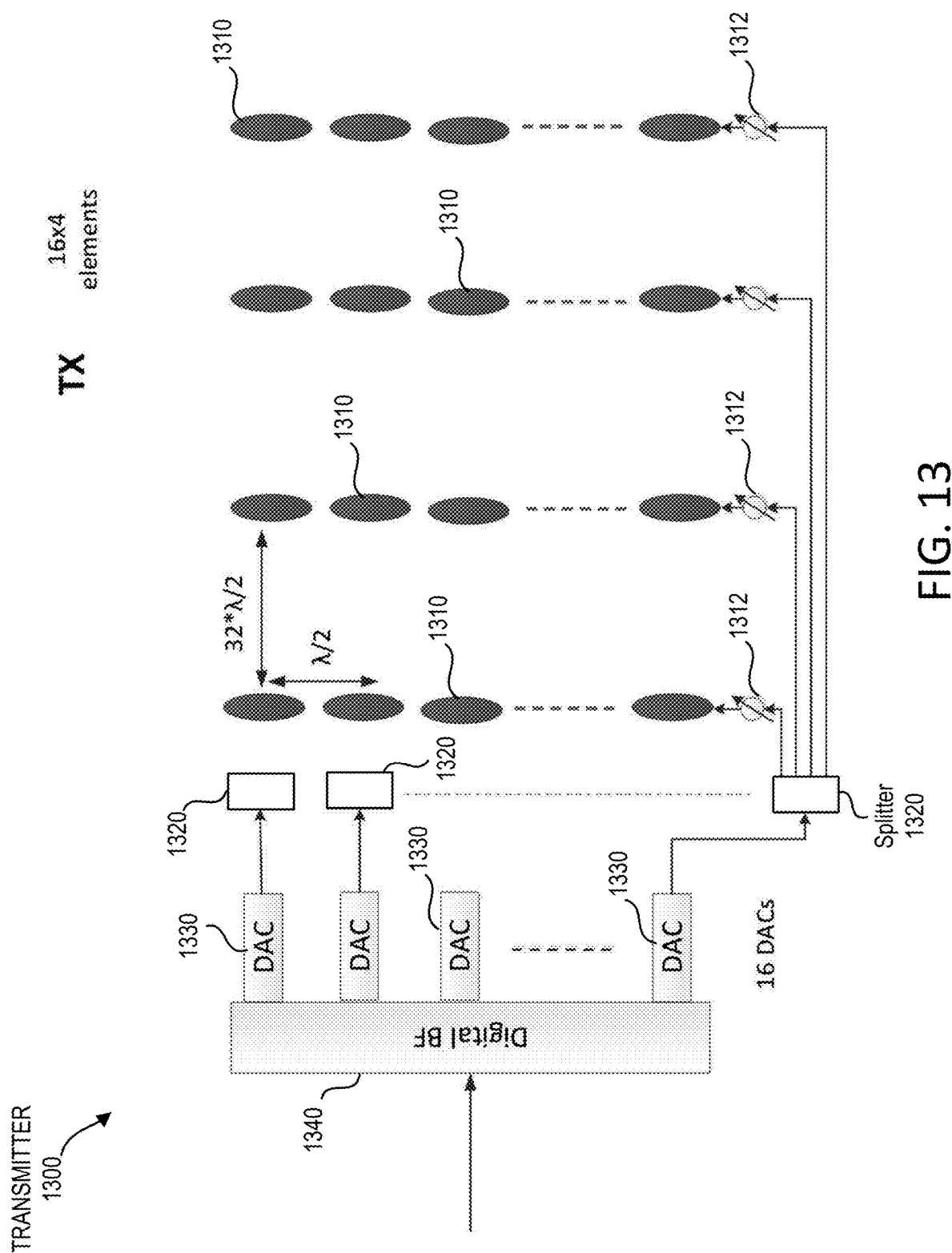
FIG. 13 illustrates an example of a transmitter configured for both azimuth and elevation scanning, according to certain embodiments.

FIG. 13 shows an example transmitter 1300 in a hybrid MIMO system for both azimuth and elevation scanning, according to certain embodiments. The transmitter 1300 includes a two-dimensional array of antenna elements 1310 arranged in four columns (e.g., a 4×16 grid for a total of 64 transmit antennas). The columns of the transmit antenna array are sparsely spaced (e.g., 32λ/2 apart). Within each column, the separation between adjacent antenna elements can be more closely spaced (e.g., λ/2).

In the example of FIG. 13, the transmitter 1300 is configured to perform both analog and digital beamforming. Thus, the transmitter 1300 can include a set of splitters 1320 and a digital BF 1340 coupled to each splitter 1320 through separate DACs 1330. Further, each splitter 1320 can be configured to generate a separate signal for each antenna 1310 in a particular row of the transmit antenna array (e.g., four signals, each of which is phase shifted by a corresponding phase shifter 1312).

Figure 14:
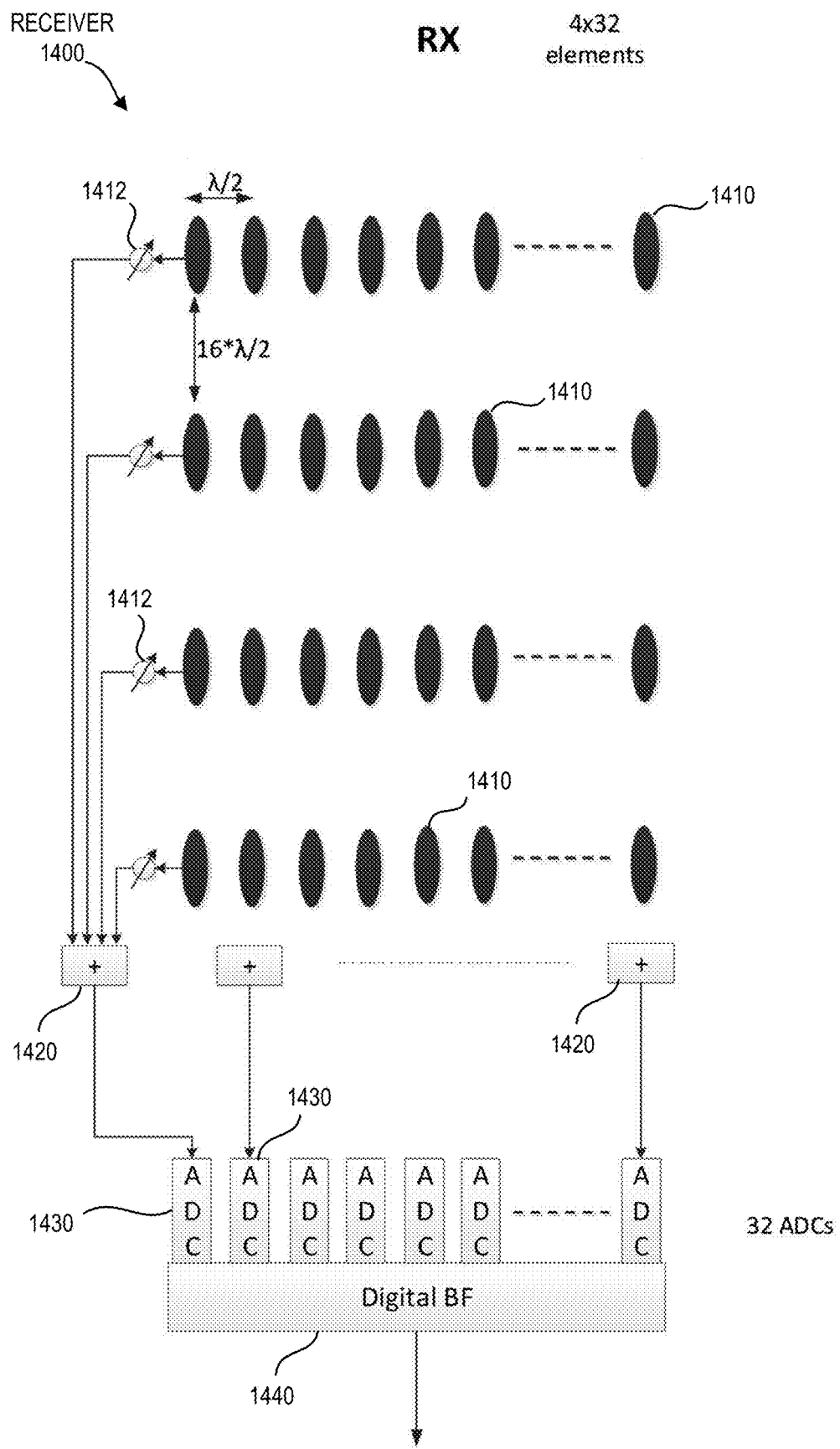
FIG. 14 illustrates an example of a receiver configured for both azimuth and elevation scanning, according to certain embodiments.

FIG. 14 shows an example receiver 1400 in a hybrid MIMO system for both azimuth and elevation scanning, according to certain embodiments. The receiver 1400 includes a two-dimensional array of antenna elements 1410 arranged in 32 columns (e.g., a 32×4 grid for a total of 128 receive antennas). The columns of the receive antenna array can be more closely spaced compared to the columns of the transmit antenna array in FIG. 13 (e.g., λ/2 apart, the same as the separation between adjacent antenna elements in a column of the transmitter 1300). Within each column of the receive antenna array, the spacing between adjacent antenna elements (i.e., the distance between rows) can be less closely spaced than the column spacing of the receive antennas (e.g., 16λ/2 apart).

In the example of FIG. 14, the receiver 1400 is configured to perform both analog and digital beamforming. Thus, the receiver 1400 can include a set of analog combiners 1420 (one analog combiner 1420 for each column), a set of ADCs 1430 (one ADC 1430 for each column), and a digital BF 1440. Further, each analog combiner 1420 can be configured to combine signals from a particular column of the receive antenna array (e.g., four signals, each of which is phase shifted by a corresponding phase shifter 1412).

If the transmitter 1300 and the receiver 1400 are used together to implement a virtual array, then the virtual array would, for example, be an array of 64×128 elements. The transmitter 1300 would, for example, include 16 DACs 1330, and the receiver 1400 would, for example, include 32 ADCs 1430. Steering in the azimuth direction could be performed using analog beamforming in the transmitter 1300 (e.g., by changing the phase configuration of the phase shifters 1312) in combination with using digital beamforming in the receiver 1400 (e.g., digital phase shifting performed by the digital BF 1440). Steering in the elevation direction could be performed using digital beamforming in the transmitter 1300 (e.g., digital phase shifting performed by the digital BF 1340) in combination with using analog beamforming in the receiver 1400 (e.g., by changing the phase configuration of the phase shifters 1412).

The transmitter 1300 can be operated such that all transmit antennas 1310 are active during a given transmission. Each transmission by the transmitter 1300 would then illuminate a single elevation direction and multiple azimuth directions, and these directions could be digitally extracted by the receiver 1400. The use of 4-level phase shifters for both the transmitter 1300 and receiver 1400 (e.g., as the phase shifters 1312 and 1412) would be sufficient in order to support scanning in the azimuth and elevation directions.

To illustrate processing for the azimuth direction, consider one row of the transmitter 1300 (e.g., 4 transmit antennas 1310) and one row of the receiver 1400 (e.g., 32 receive antennas 1410). The analog phase shifters 1312 connected to each column in the transmitter 1300 can be used to cause the entire row of the transmitter 1300 to transmit the same signal simultaneously with different phases. In the receiver 1400, each of the 32 columns, and thus each receive antenna 1410 in the receiver row under consideration, is connected to a respective ADC 1430.

To illustrate processing for the elevation direction, consider one column of the transmitter (e.g., 16 transmit antennas 1310) and one column of the receiver 1400 (e.g., 4 receive antennas 1410). Each transmit antenna 1310 in the column of the transmitter 1300 is coupled to a separate DAC 1330 via a corresponding splitter 1320. Each DAC 1330 receives the same transmit signal, but with a respective phase being applied digitally. Each receive antenna 1410 in the column of the receiver 1400 is coupled to a corresponding phase shifter 1412. The outputs of the phase shifters are summed by an analog combiner 1420 for input to the same ADC 1430.

As indicated above, the transmitter 1300 can be operated such that with each transmission (e.g., using all transmit antennas 1310), the signals are transmitted to a single elevation direction and multiple azimuth directions. This would allow the receiver 1400 to detect one elevation direction and multiple azimuth directions (e.g. a quarter of all azimuth directions in the field of view). The remaining elevation and azimuth directions in the field of view could be swept/scanned during subsequent transmissions. For example, in the next transmission, another elevation direction could be detected together with another quarter of all azimuth directions.

In automotive radar applications, the angular requirements for azimuth are typically much wider (e.g., 90 degree field of view) compared to elevation (e.g., 20 degree field of view). For this reason, a radar system implementing hybrid MIMO (e.g., based on the transmitter 1300 and the receiver 1400) and featuring sweeping of one elevation direction at a time (e.g., via digital beamforming in the transmitter and analog beamforming in the receiver), but simultaneous calculation of multiple azimuth directions (e.g., via digital beamforming in the receiver and analog beamforming in the transmitter), was chosen for discussion herein. However, the manner in which digital beamforming and analog beamforming are used in the transmitter and receiver could be reversed (e.g., to detect one azimuth direction and multiple elevation directions with each transmission). In some such embodiments, accuracy of the analog phase shifters 1312 and 1412 may be increased by way of more supported quantization levels. Accordingly, the type of phase shifters used in a transmitter or receiver of a radar system implementing the hybrid MIMO techniques described herein, as well as the type of beamforming (analog and/or digital) performed by such a transmitter or receiver can vary depending on the radar application.

The example transmitter and receiver configurations described above in connection with FIGS. 13 and 14 can be adapted for other hybrid MIMO implementations. For example, in some embodiments, all of the analog processing for both azimuth and elevation could be performed by the transmitter, and all of the digital processing for both azimuth and elevation could be performed by the receiver. On the transmitter, there would be phase shifters with DACs (similar to the example of FIG. 7), and on the receiver there would be a digital BF and ADCs, but without analog phase shifters (similar to the example of FIG. 8). As with the examples discussed above, 4-level phase shifters may be sufficient for implementing such additional embodiments. In one particular implementation, the transmitter could be a 4×4 square array of sparsely spaced antenna elements, and the receiver could be 32 rows×16 columns array of antenna elements spaced by half a wavelength, thus using fewer antenna elements on the transmit side and more antenna elements on the receive side than in the examples of FIGS. 13 and 14.

In summary, the hybrid MIMO techniques described herein provide many advantages compared to existing radar systems. For example, a transmitter can be implemented using a simple analog phased array with a single DAC, while a receiver can be implemented using multiple ADCs and can digitally generate multiple beams (e.g., according to the embodiments of FIGS. 7 and 8). Further, analog beamforming can be performed at the transmitter using relatively low accuracy phase shifters while avoiding the high phase quantization error associated with traditional analog beamforming. Additionally, link margin (maximum detectable target distance) may be improved due to transmit beamforming gain since all transmit antennas can be operated to transmit coherently. In contrast to TDM MIMO, for each transmission a subset of beams can be digitally generated in the receiver without any coherency loss caused by the Doppler effect. Yet another advantage is that the receiver architecture can be kept relatively simple, without requiring, for example, parallel orthogonal waveform processing or combining of different transmissions for beam construction.

Example Methods and Devices

Figure 15:
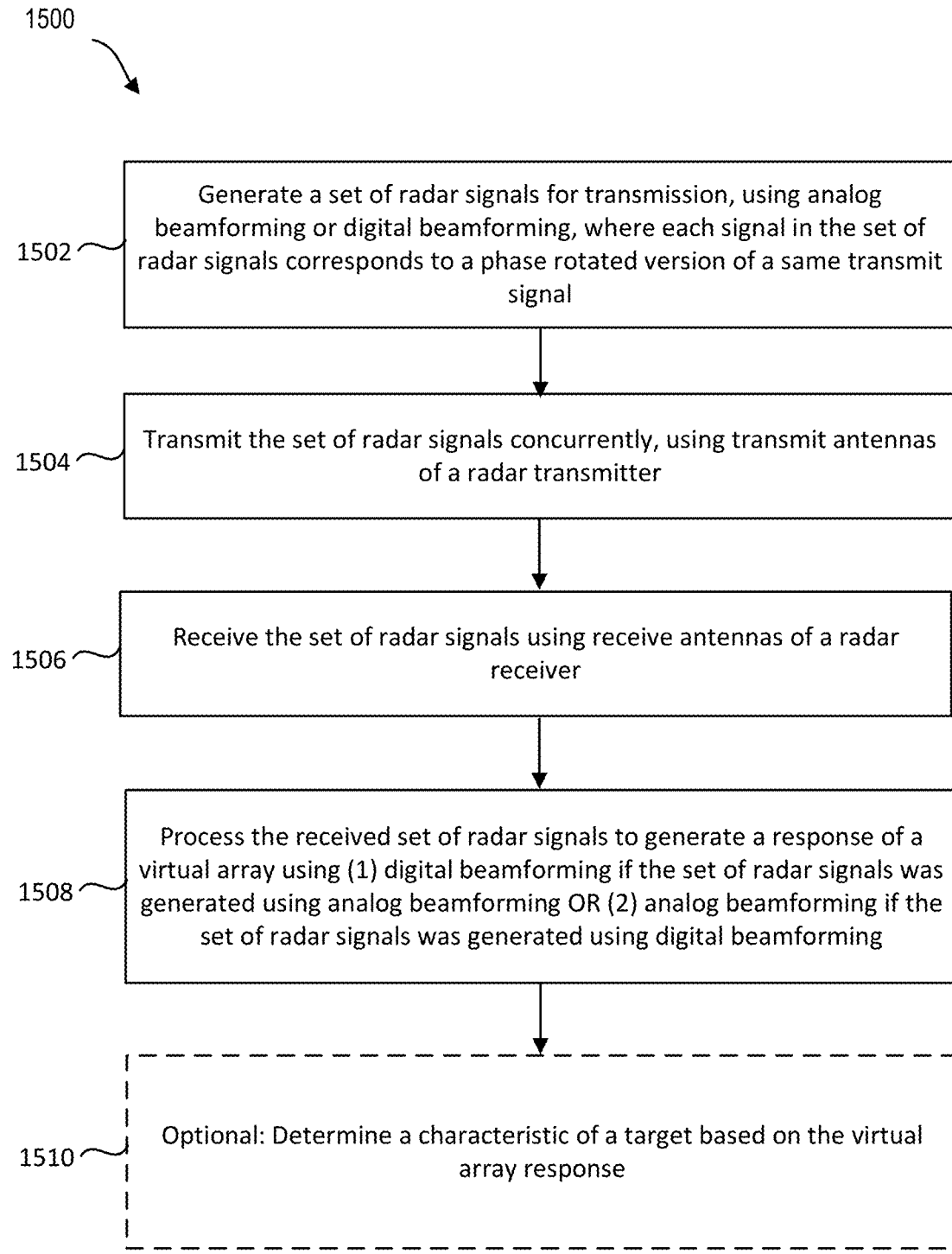
FIG. 15 is a flow diagram illustrating a method of scanning a field of view, according to certain embodiments.

FIG. 15 is a flow diagram illustrating a method 1500 of scanning a field of view, according to certain embodiments. In some embodiments, the functionality of one or more blocks illustrated in FIG. 15 may be performed by a radar system including a radar transmitter and a radar receiver (e.g., the radar system 100 in FIG. 1). One or more of the functions described in the blocks illustrated in FIG. 15 may be performed by software and/or hardware components (e.g., a Digital Signal Processor (DSP)) of an electronic device, such as the electronic device illustrated in FIG. 16 and described below, and/or by one or more of the components illustrated in FIG. 1 (which may be incorporated into the electronic device in FIG. 16). Moreover, a person of ordinary skill in the art will appreciate that alternative embodiments may vary in the way they implement the functions illustrated in FIG. 15 by adding, omitting, combining, separating, and otherwise varying the functions illustrated in the blocks of FIG. 15.

At block 1502, a set of radar signals are generated for transmission. The set of radar signals can be generated using analog or digital beamforming. For instance, in some embodiments, such as the embodiment of FIG. 7, the set of radar signals can be generated by converting a digital transmit signal (e.g., a pulsed signal or a frequency modulated continuous wave) generated by a radar transmitter into an analog signal (e.g. using DAC 730), followed by splitting the analog signal so that the analog signal is supplied to a set of analog phase shifters. In this manner, each signal in the set of radar signals may correspond to the same transmit signal, but with a respective phase being applied. In other embodiments, such as the embodiment in FIG. 13, the set of radar signals can be generated by digitally phase shifting a transmit signal using a digital beamformer (e.g., digital BF 1340).

At block 1504, the set of radar signals is transmitted concurrently using transmit antennas of a radar transmitter. As indicated above, each transmit antenna can receive a the transmit signal with a respective phase applied, and depending on the phase configuration across all the transmit antennas, the resulting beam(s) that are formed by the concurrent transmission of radar signals can be emitted in one or more directions depending on how the individual radar signals combine through constructive and/or destructive interference.

At block 1506, the set of radar signals that was transmitted in block 1504 is received by receive antennas of a radar receiver. In some embodiments, the radar transmitter that transmits the signals in block 1504 and the radar receiver that receives the signals in block 1506 are located on the same device. However, the radar transmitter and the radar receiver do not have to be co-located. The set of radar signals may be received, for example, after being reflected off one or more targets in a field of view.

At block 1508, the received set of radar signals is processed to generate a response of a virtual array, using beamforming. The beamforming in block 1508 may involve analog or digital beamforming and can be performed in a complementary fashion to the beamforming used to generate the set of radar signals in block 1502. For instance, if the set of radar signals was generated using analog beamforming, then the virtual array response can be generated using digital beamforming and based on knowledge of the phase configuration (i.e., the individual phase rotations) used as part of the analog beamforming performed by the radar transmitter. Similarly, if the set of radar signals was generated using digital beamforming, then the virtual array response can be generated using analog beamforming (e.g., using 4-level phase shifters in the radar receiver) and based on knowledge of the phase configuration used as part of the digital beamforming performed by the radar transmitter.

The virtual array response generated in block 1508 can correspond to that of a virtual array of antennas, as discussed above in connection with the example in FIG. 6. Further, the virtual array response in block 1508 can be represented as a combined beam pattern (e.g., the combined beam pattern 1100 in FIG. 11) corresponding to a spatial convolution between a transmit beam pattern represented in the set of radar signals as transmitted by the transmit antennas and a receive beam pattern represented by the responses of the receive antennas to receiving the set of radar signals. As indicated above, the virtual array response generated by a radar receiver for a given transmission (e.g., the set of signals in block 1504) can make up a subset of the entire field of view. To scan the entire field of view, the functionality in blocks 1502 to 1508 can be repeated with a different phase configuration, thereby transmitting another set of radar signals in a different direction and, at the receiver, generating a virtual array response covering the different direction.

At block 1510, a characteristic of a target is determined based on the virtual array response from block 1508. The functionality in block 1510 is optional and can be implemented by a signal processing subsystem (e.g., the signal processing subsystem 130 in FIG. 1). In some embodiments, the functionality in block 1510 can be built into the radar receiver. In other embodiments, the functionality in block 1510 can be provided by a separate electronic device or computer system coupled to the radar system. Various target characteristics can be determined based on the beam pattern, including distance, velocity, azimuth, elevation, or a combination thereof. The determination of such characteristics may involve spectral analysis (e.g., one or more Fourier transforms) to identify the energy of the beam pattern at different frequencies and spatial locations. Depending on the location of a target, multiple scans in different directions may be required before the target is detected and its characteristics determined.

The example in FIG. 15 describes the transmitted radar signals as being generated using either analog or digital beamforming. However, as discussed above in connection with the embodiments of FIGS. 13 and 14, a transmitter and a receiver can each be configured to performed both analog beamforming and digital beamforming. The beamforming performed by the receiver may, nevertheless, be complementary in nature to the beamforming performed by the transmitter. For example, as indicated above, steering in the azimuth direction can be performed using analog beamforming in the transmitter in combination with digital beamforming in the receiver; and steering in the elevation direction can be performed using digital beamforming in the transmitter in combination with analog beamforming in the receiver.

Figure 16:
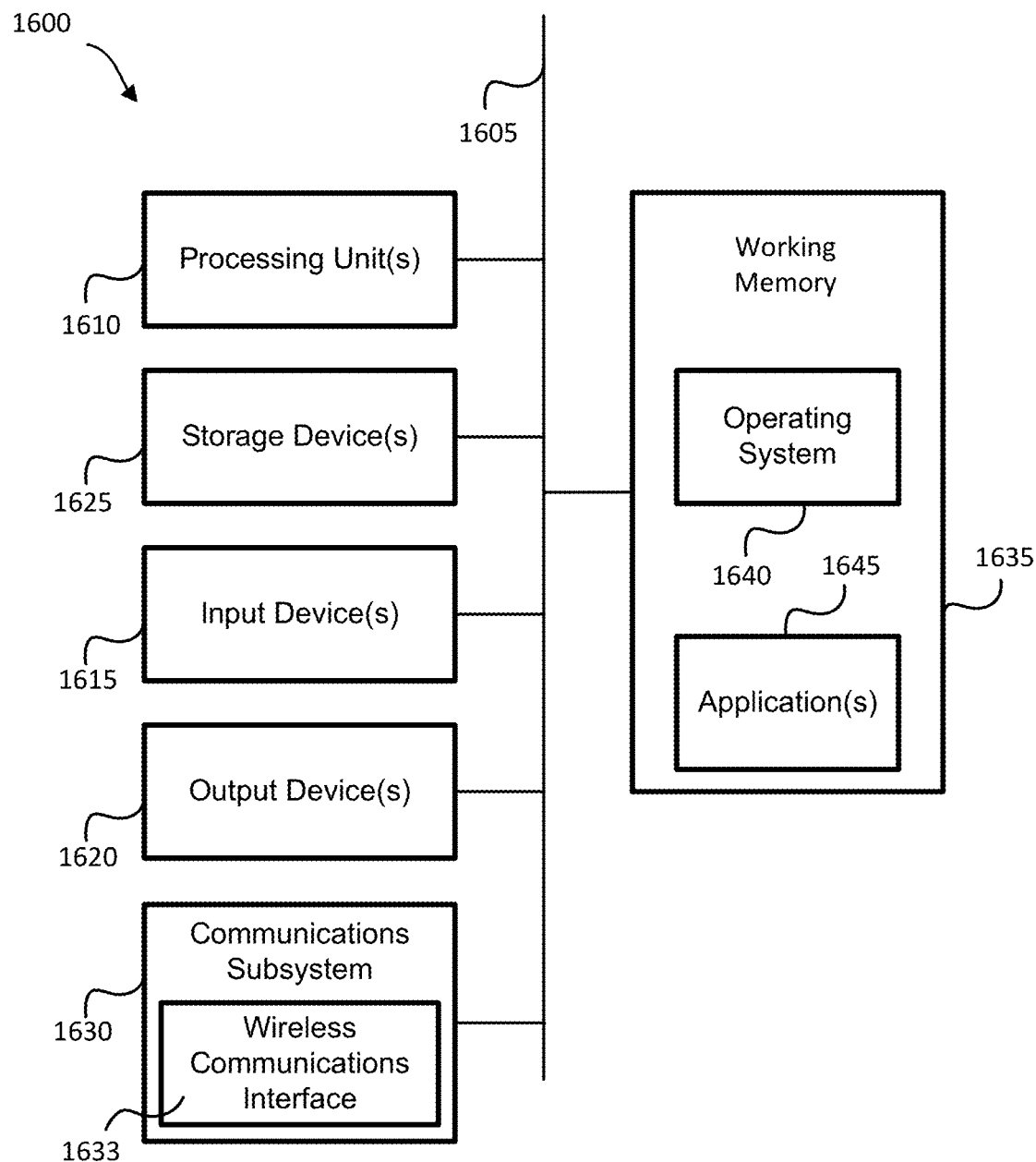
FIG. 16 illustrates an example of an electronic device usable for implementing one or more embodiments.

FIG. 16 illustrates an example of an electronic device 1600 usable for implementing one or more embodiments described above. For instance, in the embodiment of FIG. 1, the electronic device 1600 can be used to implement functionality provided by the transmitter 110, the receiver 120, and/or the signal processing subsystem 130. The electronic device 1600 can also be used to implement the method described in FIG. 15.

It should be noted that FIG. 16 is meant only to provide a generalized illustration of various components, any or all of which may be utilized as appropriate. FIG. 16, therefore, broadly illustrates how individual system elements may be implemented in a relatively separated or relatively more integrated manner. In addition, it can be noted that components illustrated by FIG. 16 can be localized to a single device and/or distributed among various networked devices, which may be disposed at different physical locations (e.g., different locations in an automobile). For automotive applications, the electronic device 1600 may comprise an automobile's on-board computer.

The electronic device 1600 is shown as including hardware elements that can be electrically coupled via a bus 1605 (or may otherwise be in communication, as appropriate). The hardware elements may include processing unit(s) 1610, which can include without limitation one or more general-purpose processors, one or more special-purpose processors (such as a Digital Signal Processor (DSP), Graphics Processing Unit (GPU), Application-Specific Integrated Circuit (ASIC), Field Programmable Gate Array (FPGA), and/or the like), and/or other processing structure, which may be configured to perform one or more of the functions in the methods described herein, including the method illustrated in FIG. 15. The electronic device 1600 also can include one or more input devices 1615, which can include without limitation a touchscreen display or other user interface, one or more automation systems for an automated vehicle, and/or the like; and one or more output devices 1620, which can include without limitation a display device, the one or more automation systems for an automated vehicle, and/or the like.

The electronic device 1600 may further include (and/or be in communication with) one or more non-transitory storage devices 1625, which can comprise, without limitation, local and/or network accessible storage, and/or can include, without limitation, a disk drive, a drive array, an optical storage device, a solid-state storage device, such as a random access memory (RAM), and/or a read-only memory (ROM), which can be programmable, flash-updateable, and/or the like. Such storage devices may be configured to implement any appropriate data stores, including without limitation, various file systems, database structures, and/or the like.

The electronic device 1600 may also include a communications subsystem 1630, which can support wired communication technologies and/or wireless communication technologies, and be managed and controlled through a wireless communication interface 1633. The communications subsystem 1630 may include a modem, a network card (wireless or wired), an infrared communication device, a wireless communication device, a chipset, and/or the like. The communications subsystem 1630 may include one or more input and/or output communication interfaces, such as the wireless communication interface 1633, to permit data and signaling to be exchanged with a network, mobile devices, other computer systems, and/or any other electronic devices described herein.

In some embodiments, the electronic device 1600 further comprises a working memory 1635, which can include a RAM and/or or ROM device. Software elements, shown as being located within the working memory 1635, can include an operating system 1640, device drivers, executable libraries, and/or other code, such as application(s) 1645, which may comprise computer programs provided by various embodiments, and/or may be designed to implement methods, and/or configure systems, provided by other embodiments, as described herein. By way of example, one or more functions described with respect to the methods discussed above, such as the method described in connection with FIG. 15, may be implemented as code and/or instructions that are stored (e.g., temporarily) in working memory 1635 and are executable by a computer (and/or a processing unit within a computer, such as processing unit(s) 1610). In an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the storage device(s) 1625 described above. In some cases, the storage medium might be incorporated within a computer system, such as electronic device 1600. In other embodiments, the storage medium might be separate from a computer system (e.g., a removable medium, such as an optical disc), and/or provided in an installation package, such that the storage medium can be used to program, configure, and/or adapt a general purpose computer with the instructions/code stored thereon. These instructions might take the form of executable code, which is executable by the electronic device 1600 and/or might take the form of source and/or installable code, which, upon compilation and/or installation on the electronic device 1600 (e.g., using any of a variety of generally available compilers, installation programs, compression/decompression utilities, etc.), then takes the form of executable code.

In certain embodiments, at least a portion of the processing performed by a radar system is implemented in software using executable instructions (e.g., instructions executed by one or more processors of a computer system incorporating or coupled to a radar transmitter and/or a radar receiver), where the instructions are stored on a computer-readable medium. Components that can include memory can include non-transitory machine-readable media. The terms "machine-readable medium" and "computer-readable medium" as used herein, refer to any storage medium that participates in providing data that causes a machine to operate in a specific fashion. In embodiments provided above, various machine-readable media might be involved in providing instructions/code to processing units and/or other device(s) for execution. Additionally or alternatively, the machine-readable media might be used to store and/or carry such instructions/code. In certain implementations, a computer-readable medium is a physical and/or tangible storage medium. Such a medium may take many forms, including but not limited to, non-volatile media, volatile media, and transmission media. Common forms of computer-readable media include, for example, magnetic and/or optical media, a RAM, a PROM, EPROM, a FLASH-EPROM, any other memory chip or cartridge, or any other medium from which a computer can read instructions and/or code.

The methods, systems, and devices discussed herein are examples. Various embodiments may omit, substitute, or add various procedures or components as appropriate. Features described with respect to certain embodiments may be combined in various other embodiments. Different aspects and elements of the embodiments may be combined in a similar manner. The various components of the figures provided herein can be embodied in hardware and/or software. Also, technology evolves and, thus, many of the elements are examples that do not limit the scope of the disclosure to those specific examples.

Terms, "and" and "or" as used herein, may include a variety of meanings that also is expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

The previous description is provided to enable a person skilled in the art to make or use the disclosed embodiments. Various modifications to these embodiments will be readily apparent to those skilled in the art, and the techniques described herein may be applied to other embodiments without departing from the scope of the disclosure. Thus, the present disclosure is to be accorded the widest scope possible consistent with the principles and novel features as defined by the following claims.

What is claimed is:

1. A radar apparatus, comprising:
   a transmitter comprising:
      a digital to analog converter (DAC);
      a splitter;
      a plurality of transmit antennas; and
      a plurality of phase shifters, wherein a corresponding phase shifter of the plurality of phase shifters is coupled between each separate transmit antenna of the plurality of transmit antennas and a corresponding output of the splitter, wherein an input to the splitter is coupled to the DAC, the transmitter being configured to transmit a first set of radar signals, each signal in the first set of radar signals being transmitted by each separate transmit antenna of the plurality of transmit antennas and corresponding to a same transmit signal, but with a particular phase applied by the corresponding phase shifter that is specific to each separate transmit antenna to generate a plurality of transmit grating lobes, and wherein each phase shifter has a discrete number of level settings to allow scanning of an entire field of view using the plurality of transmit grating lobes;
   a receiver comprising:
      a plurality of receive antennas;
      a digital beamformer; and
      a plurality of analog to digital converters (ADCs) with each ADC coupled between a corresponding receive antenna of the plurality of receive antennas and a corresponding input to the digital beamformer, the receiver being configured to: receive the first set of radar signals using the plurality of receive antennas; and generate a first virtual array response using the digital beamformer, the first virtual array response corresponding to an array of virtual antennas, wherein the array of virtual antennas is associated with a distance between adjacent antennas of the plurality of transmit antennas being at least double a spacing distance for adjacent antennas of the plurality of receive antennas, wherein the first virtual array response covers a subset of directions within a field of view.

2. The radar apparatus of claim 1, wherein the transmitter is configured to generate the first set of radar signals using analog beamforming with the discrete number of level settings, and the receiver is configured to generate the first virtual array response using digital beamforming.

3. The radar apparatus of claim 1, wherein the receiver is further configured to:
   receive a second set of radar signals transmitted from the transmitter after the first set of radar signals; and
   generate, based on the second set of radar signals, a second virtual array response, wherein the second virtual array response covers a different subset of directions within the field of view than the first virtual array response.

4. The radar apparatus of claim 3, wherein a first subset of directions and a second subset of directions each include an elevation direction and multiple azimuth directions.

5. The radar apparatus of claim 3, wherein the transmitter is configured to determine a first set of phase rotations for transmitting the first set of radar signals and a second set of phase rotations for transmitting the second set of radar signals, the first set of phase rotations being different from the second set of phase rotations.

6. The radar apparatus of claim 1, wherein the transmitter is configured to transmit the first set of radar signals concurrently.

7. The radar apparatus of claim 1, wherein the receiver is configured to perform an elevation direction scan.

8. The radar apparatus of claim 1, wherein the receiver is configured to perform an azimuth direction scan.

9. The radar apparatus of claim 1, wherein each antenna of the plurality of transmit antennas is spaced from all other antennas in the plurality of transmit antennas by a distance at least two times a wavelength of one or more analog signals.

10. The radar apparatus of claim 9, wherein the plurality of receive antennas are spaced from one another by one half the wavelength.

11. The radar apparatus of claim 1, wherein a
   respective phase is applied to each transmit signal of the plurality of transmit signals in an analog domain.

12. The radar apparatus of claim 1, wherein the splitter includes an analog splitter.

13. The radar apparatus of claim 1, wherein the discrete number of level settings is for a first linear array of the first virtual array, and wherein the discrete number of level settings is approximately equal to a spacing between the plurality of transmit grating lobes divided by a beam width associated with antennas of the first linear array.

14. The radar apparatus of claim 13, wherein the beam width associated with the plurality of transmit grating lobes is approximately $2\pi/N$, where N is a number of antennas in the array of virtual antennas for azimuth and elevation scanning.

15. The radar apparatus of claim 14, where N is determined by a convolution of the plurality of transmit antennas and the plurality of receive antennas.

16. The radar apparatus of claim 15, wherein:
the plurality of receive antennas comprises 32 antennas with $\lambda/2$ spacing;
the plurality of transmit antennas comprises 4 antennas with $2*\lambda$ spacing; and
the number of antennas in the linear array of the array of virtual antennas is 128.

17. The radar apparatus of claim 1, wherein:
the plurality of receive antennas comprises 32 antennas with $\lambda/2$ spacing;
the plurality of transmit antennas comprises 4 antennas with $2*\lambda$ spacing; and
the discrete number of level settings is 4.

18. The radar apparatus of claim 1, wherein the transmitter further comprises:
a transmit digital beamformer having a signal input and a plurality of outputs, wherein the plurality of outputs are coupled to corresponding inputs of the plurality of DACs;
a plurality of DACs comprising the DAC; and
a plurality of splitters comprising the splitter;
wherein the plurality of transmit antennas are configured in a two-dimensional array comprising a plurality of antenna rows and a plurality of antenna columns, wherein each splitter of the plurality of splitters is coupled to a corresponding antenna of the plurality of transmit antennas, and wherein each DAC of the plurality of DACs is associated with a corresponding antenna row of the plurality of antenna rows.

19. A method, comprising:
transmitting, by a radar transmitter, a first set of radar signals, wherein the radar transmitter comprises a digital to analog converter (DAC), a splitter, a plurality of transmit antennas, and a plurality of phase shifters, wherein a corresponding phase shifter of the plurality of phase shifters is coupled between each separate transmit antenna of the plurality of transmit antennas and a corresponding output of the splitter, wherein an input to the splitter is coupled to the DAC, the radar transmitter being configured to transmit the first set of radar signals, each signal in the first set of radar signals being transmitted by each separate transmit antenna of the plurality of transmit antennas and corresponding to a same transmit signal, but with a particular phase applied by the corresponding phase shifter that is specific to each separate transmit antenna to select a discrete scanning position for a plurality of transmit grating lobes, and each phase shifter has a discrete number of level settings to allow scanning of an entire field of view using the plurality of transmit grating lobes; and
receiving, by a radar receiver including a plurality of receive antennas, the first set of radar signals transmitted from the radar transmitter, wherein the radar receiver comprises a plurality of receive antennas, a digital beamformer, and a plurality of analog to digital converters (ADCs) with each ADC coupled between a corresponding receive antenna of the plurality of receive antennas and a corresponding input to the digital beamformer, the radar receiver being configured to receive the first set of radar signals using the plurality of receive antennas; and generate a first virtual array response using the digital beamformer, the first virtual array response corresponding to an array of virtual antennas, wherein the array of virtual antennas is associated with a distance between adjacent antennas of the plurality of transmit antennas being at least double a spacing distance for adjacent antennas of the plurality of receive antennas, wherein the first virtual array response covers a subset of directions within a field of view.

20. The method of claim 19, wherein the first set of radar signals is generated using analog beamforming and the first virtual array response is generated using digital beamforming.

21. The method of claim 19, further comprising:
receiving, by the radar receiver, a second set of radar signals transmitted from the radar transmitter after the first set of radar signals; and
generating, by the radar receiver and based on the second set of radar signals, a second virtual array response, wherein the second virtual array response covers a different subset of directions within the field of view than the first virtual array response.

22. The method of claim 21, wherein a first subset of directions and a second subset of directions each include an elevation direction and multiple azimuth directions.

23. The method of claim 21, further comprising:
determining, by the radar transmitter, phase rotations for transmitting the second set of radar signals, wherein the phase rotations for transmitting the second set of radar signals are different from phase rotations used to transmit the first set of radar signals.

24. The method of claim 19, wherein the radar receiver is configured to cause an elevation direction to be scanned.

25. The method of claim 19, wherein the radar receiver is configured to cause an azimuth direction to be scanned.

26. The method of claim 19, further comprising:
transmitting, by the radar transmitter, the first set of radar signals concurrently.

27. The method of claim 19, wherein the plurality of transmit antennas consists of 4 antennas, wherein a first discrete scanning position is associated with a 0 phase applied by the corresponding phase shifter to each separate transmit antenna, and wherein a second discrete scanning position is associated with a 0 phase applied to a first antenna, a $\pi/2$ phase applied to a second antenna, a $\pi$ phase applied to a third antenna, and a $3\pi/2$ phase applied to a fourth antenna of the plurality of transmit antennas.

28. An apparatus comprising:
means for generating a first set of radar signals, each signal in the first set of radar signals corresponding to a same transmit signal, but with a respective phase being applied for generation of transmit grating lobes in a discrete analog scanning field of view;
means for transmitting the first set of radar signals concurrently;
means for receiving the first set of radar signals;
means for generating, based on the first set of radar signals, a first virtual array response corresponding to an array of virtual antennas, wherein the first virtual array response covers a subset of directions within a field of view, and wherein the first virtual array response and the array of virtual antennas are associated with a distance between adjacent antennas of a plurality of transmit antennas being at least double a spacing distance for adjacent antennas of a plurality of receive antennas.

29. The apparatus of claim 28, wherein:
the means for generating the first set of radar signals is configured to generate the first set of radar signals using analog beamforming;
the means for generating the first virtual array response is configured to generate the first virtual array response using digital beamforming;
the means for transmitting the first set of radar signals concurrently includes the plurality of transmit antennas;
the means for receiving the first set of radar signals includes the plurality of receive antennas.

30. The apparatus of claim 28, further comprising:
means for generating a second set of radar signals;
means for transmitting the second set of radar signals concurrently after the first set of radar signals have been transmitted;
means for receiving the second set of radar signals; and
means for generating, based on the second set of radar signals, a second virtual array response, wherein the second virtual array response covers a different subset of directions within the field of view than the first virtual array response.

31. The apparatus of claim 30, wherein the subset of directions and the different subset of directions each include an elevation direction and multiple azimuth directions.

32. The apparatus of claim 30, further comprising:
means for determining phase rotations for transmitting the second set of radar signals, wherein the phase rotations for transmitting the second set of radar signals are different from phase rotations used to transmit the first set of radar signals.

\* \* \* \* \*